(12) United States Patent
Lahann et al.

(10) Patent No.: US 8,043,480 B2
(45) Date of Patent: Oct. 25, 2011

(54) METHODS FOR FORMING BIODEGRADABLE NANOCOMPONENTS WITH CONTROLLED SHAPES AND SIZES VIA ELECTRIFIED JETTING

(75) Inventors: Joerg Lahann, Ann Arbor, MI (US); Srijanani Bhaskar, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 48 days.

(21) Appl. No.: 12/257,945

(22) Filed: Oct. 24, 2008

(65) Prior Publication Data
US 2010/0038830 A1 Feb. 18, 2010

Related U.S. Application Data

(63) Continuation-in-part of application No. 11/272,194, filed on Nov. 10, 2005, now Pat. No. 7,767,017, application No. 12/257,945.

(60) Provisional application No. 60/626,792, filed on Nov. 10, 2004, provisional application No. 60/651,288, filed on Feb. 9, 2005, provisional application No. 60/982,389, filed on Oct. 24, 2007.

(51) Int. Cl.
*H05F 3/00* (2006.01)
*B05D 1/04* (2006.01)
*B29C 67/00* (2006.01)

(52) U.S. Cl. ............ 204/164; 106/401; 264/9; 264/484; 424/489; 977/906

(58) Field of Classification Search .................. None
See application file for complete search history.

(56) References Cited

U.S. PATENT DOCUMENTS

| | | | |
|---|---|---|---|
| 3,060,429 | A | 10/1962 | Winston |
| 4,621,268 | A | 11/1986 | Keeling et al. |
| 5,560,543 | A | 10/1996 | Smith et al. |
| 5,741,138 | A | 4/1998 | Rice et al. |
| 5,813,614 | A | 9/1998 | Coffee |
| 6,007,845 | A | 12/1999 | Domb et al. |
| 6,063,365 | A | 5/2000 | Shefer et al. |

(Continued)

FOREIGN PATENT DOCUMENTS

EP 1809719 7/2007
(Continued)

OTHER PUBLICATIONS

Gupta et al., Polymer, 44(2003), 6353-6359.*
(Continued)

*Primary Examiner* — Melvin Mayes
*Assistant Examiner* — Yun Qian
(74) *Attorney, Agent, or Firm* — Harness, Dickey & Pierce, P.L.C.

(57) ABSTRACT

Methods of forming a plurality multiphasic nano-components (MPNs) having at least two phases, with high selectivity for at least one of shape, size, or phase orientation in the nano-component are provided. The methods provide high yields of substantially similar nano-components by controlling one or more of: polymer concentration, liquid stream composition, liquid stream conductivity, flow rate, humidity, temperature, pressure, electrode design and/or configuration during an electrified jetting process. Such methods of making MPNs form shapes including disks, rods, spheres, rectangles, polygons, toroids, cones, pyramids, cylinders, fibers, and combinations thereof. Such MPNs can be used in various applications, including for medical diagnostics or with pharmaceutical, personal care, oral care, and/or nutritional compositions.

18 Claims, 10 Drawing Sheets

Confocal Laser Scanning Micrographs of BBMPs: Fibers

Confocal Laser Scanning Micrographs of BBMPs: Rods

U.S. PATENT DOCUMENTS

| | | | |
|---|---|---|---|
| 6,107,102 | A | 8/2000 | Ferrari |
| 6,132,702 | A | 10/2000 | Witt et al. |
| 6,252,129 | B1 | 6/2001 | Coffee |
| 6,267,724 | B1 | 7/2001 | Taylor |
| 6,306,993 | B1 | 10/2001 | Rothbard et al. |
| 6,391,471 | B1 | 5/2002 | Hiraoka et al. |
| 6,491,902 | B2 | 12/2002 | Shefer et al. |
| 6,548,264 | B1 | 4/2003 | Tan et al. |
| 6,589,562 | B1 | 7/2003 | Shefer et al. |
| 6,669,961 | B2 * | 12/2003 | Kim et al. ............ 424/489 |
| 6,685,921 | B2 | 2/2004 | Lawlor |
| 6,703,235 | B2 | 3/2004 | Luebke et al. |
| 6,766,817 | B2 | 7/2004 | da Silva et al. |
| 6,811,090 | B2 | 11/2004 | Yogi et al. |
| 6,825,161 | B2 | 11/2004 | Shefer et al. |
| 6,918,404 | B2 | 7/2005 | Dias da Silva et al. |
| 7,066,586 | B2 | 6/2006 | da Silva et al. |
| 7,413,868 | B2 | 8/2008 | Kauvar et al. |
| 7,767,017 | B2 | 8/2010 | Lahann et al. |
| 2006/0201390 | A1 | 9/2006 | Lahann et al. |
| 2007/0054119 | A1 | 3/2007 | Garstecki et al. |
| 2007/0112180 | A1 | 5/2007 | Gray et al. |
| 2007/0167340 | A1 | 7/2007 | Barthel et al. |
| 2007/0231355 | A1 | 10/2007 | Quadir et al. |
| 2007/0237800 | A1 | 10/2007 | Lahann |
| 2008/0242774 | A1 | 10/2008 | Lahann et al. |
| 2010/0038830 | A1 | 2/2010 | Lahann et al. |

FOREIGN PATENT DOCUMENTS

| | | |
|---|---|---|
| JP | 2004-505761 | 2/2004 |
| JP | 2005504090 | 2/2005 |
| JP | 2008520407 | 6/2008 |
| WO | WO 02/13786 | 2/2002 |
| WO | WO 03/026611 | 4/2003 |
| WO | WO 2006/003403 | 1/2006 |
| WO | WO 2006/137936 | 12/2006 |
| WO | WO 2007/149310 | 12/2007 |
| WO | WO 2009/055693 | 4/2009 |
| WO | WO 2009/151421 | 12/2009 |
| WO | WO 2010/011641 | 1/2010 |

OTHER PUBLICATIONS

Wako Pure Chemical Industries, Ltd, http://www.wako-chem.co.jp/specialty/plga/index.htm.*

Huang et al. Composites Science and Technology, 63 (2003), 2223-2253.*

Barrero, A. et al., "Micro- and Nanoparticles via Capillary Flows," Annu. Rev. Fluid Mech., vol. 39, pp. 89-106 (2007).

Berkland C., et al., "Controlling surface nano-structure using flow-limited field-injection electrostatic spraying (FFESS) of poly(D,L-lactide-co-glycolide)," Biomaterials, vol. 25, No. 25, pp. 5649-5658 (Nov. 2004).

Bhaskar, S. et al., "Spatioselective Modification of Bicompartmental Polymer Particles and Fibers via Huisgen 1,3-Dipolar Cycloaddition," Macromol. Rapid Commun., vol. 29, No. 20, pp. 1655-1660 (Oct. 22, 2008). First published online Sep. 12, 2008.

Binks, B. P. et al., "Particles Adsorbed at the Oil-Water Interface: A Theoretical Comparison between Spheres of Uniform Wettability and "Janus" Particles," Langmuir, vol. 17, pp. 4708-4710 (2001).

Casagrande, C. et al., "Janus Beads: Realization and Behaviour at Water/Oil Interfaces," Europhys. Lett., vol. 9, No. 3, pp. 251-255 (1989).

Cayre, O. et al, "Fabrication of Dipolar Colloid Particles by Microcontact Printing," Chem. Commun., pp. 2296-22997 (2003).

Cayre, O. et al., "Fabrication of Asymmetrically Coated Colloid Particles by Microcontact Printing Techniques," J. Mater. Chem., vol. 13, pp. 2445-2450 (2003).

Cloupeau, M. et al., "Electrohydrodynamic spraying functioning modes—a critical—review," J. Aerosol Sci., vol. 25, No. 6, pp. 1021-1036 (1994).

Cloupeau, M. et al., "Electrostatic spraying of liquids—Main functioning modes, " J. Electrostatics, vol. 25, pp. 165-184 (1990).

De La Mora, J. F. et al., "The current emitted by highly conducting Taylor cones," J. Fluid Mech., vol. 260, pp. 155-184 (1994).

Erhardt, R. et al., "Amphiphillic Janus Micelles With Polystyrene and Poly(methacrylic acid) Hemispheres," J. Am. Chem. Soc., vol. 125, pp. 3260-3267 (2003).

Erhardt, R. et al., "Janus Micelles," Macromolecules, vol. 34, pp. 1069-1075 (2001).

Farokhzad, O. et al., "Nanoparticle-Aptamer Bioconjugates: A New Approach for Targeting Prostate Cancer Cells," Cancer Research, vol. 64, pp. 7668-7672 (2004).

Fridrikh, S. V. et al., "Controlling the Fiber Diameter during Electrospinning," Phys. Rev. Lett., vol. 90, No. 14, pp. 144502-1 to 144502-4 (2003).

Gomez, A. et al., "Charge and fission of droplets in electrostatic sprays," Phys. Fluids, vol. 6, No. 1, pp. 404-414 (1994).

Gunatillake, P. et al., "Biodegradable Synthetic Polymers for Tissue Engineering," European Cells and Materials, vol. 5, pp. 1-16 (2003).

Guo, K. et al., "Aptamer-based capture molecules as a novel coating strategy to promote cell adhesion," J. Cell. Mol. Med., vol. 9, No. 3, pp. 731-736 (2005).

Hicke, B. et al., "Tumor Targeting by an Aptamer," J. of Nuclear Med., vol. 47, No. 4, pp. 668-678 (2006).

Hohman, M. M. et al., "Electrospinning and electrically forced jets. II. Applications," Physics of Fluids, vol. 13, No. 8, pp. 2221-2236 (2001).

Hohman, M. M. et al., "Electrospinning and electrically forced jets. I. Stability Theory," Physics of Fluids, vol. 13, No. 8, pp. 2201-2220 (2001).

Huang, Z. et al., "A review on polymer nanofibers by electrospinning and their applications in nanocomposites," Comp. Sci. Tech., vol. 63, pp. 2223-2253 (2003).

International Search Report and Written Opinion of the International Searching Authoritiy issued on Mar. 8, 2010 in cross-referenced matter PCT/US2009/051238 (WO2010/011641).

International Search Report and Written Opinion of the International Searching Authoritiy issued on Mar. 11, 2009 in cross-referenced matter PCT/US2008/007372 (WO2009/151421).

International Search Report and Written Opinion of the International Searching Authoritiy issued on Jul. 23, 2009 in related and cross-referenced matter PCT/US2008/081145 (WO2009/055693).

Kazemi, A., et al., "Environmentally Responsive Core/Shell Particles via Electrohydrodynamic Co-jetting of Fully Miscible Polymer Solutions," Small, vol. 4, No. 10, pp. 1756-1762 (2008).

Lahann, J. et al., "Biphasic nanoparticles made by electrified jetting," 2005 APS March meeting, (Mar. 22, 2005).

Larsen, G. et al., "A Method for Making Inorganic and Hybrid (Organic/Inorganic) Fibers and Vesicles with Diameters in the Submicrometer and Micrometer Range via Sol-Gel Chemistry and Electrically Forced Liquid Jets," J. Am. Chem. Soc., vol. 125, pp. 1154-1155 (2003).

Loscertales, I. et al., "Electrically Forced Coaxial Nanojets for One-Step Hollow Nanofiber Design," J. Am. Chem. Soc., vol. 126, pp. 5376-5377 (2004).

Loscertales, I. et al., "Micro/nano Encapsulation via Electrified Coaxial Liquid Jets," Science, vol. 295, pp. 1695-1698 (2002).

Loscertales, I. et al., "Production of complex nano-structures by electro-hydro-dynamics," Mater. Res. soc. Symp. Proc., vol. 860E. pp. LL5.9.1-LL5.9.6 (2005).

Marin, A. et al., "Simple and Double Emissions via Coaxial Jet Electrosprays," The Amer. Phys. Soc., vol. 98, pp. 014502-1 to 014502-4 (2007).

Nie, Z. et al., "Janus and Ternary Particles Generated by Microfluidic Synthesis: Design, Synthesis, and Self-Assembly," J. Am. Chem. Soc., vol. 128, pp. 9408-9412 (2006).

Nisisako, T. et al., "Synthesis of Monodisperse Bicolored Janus Particles with Electrical Anisotropy Using a Microfluidic Co-Flow System," Adv. Mater., vol. 18, pp. 1152-1156 (2006).

Non-Final Office Action for U.S. Appl. No. 11/763,842 (U.S. Pub. No. 2007/0237800) dated Jun. 18, 2010.

Non-Final Office Action for U.S. Appl. No. 12/137,121 (U.S. Pub. No. 2008/0242774) dated May 25, 2010.

Non-Final Office Action for U.S. Appl. No. 12/506,712 (U.S. Pub. No. 2010/0015447) dated Sep. 22, 2010.

Non-Final Office Action for U.S. Appl. No. 12/137,121 (U.S. Pub. No. 2008/0242774) dated Feb. 3, 2010.

Notice of Rejection issued on Jul. 27, 2010 in related matter Japanese Patent Publication JP 2007-540191. English translation provided by Kashiwabara International Patent Bureau.

Palm, L. et al., "An Optical Method for Measuring Drop Flight Stability in a Continuous Ink Jet," Journal for Imaging Science and Technology, vol. 41, No. 1 (Jan./Feb. 1997).

Paunov, V. et al., "Novel Technique for Preparation of Dipolar Microparticles by Polymerization of Polarised Emulsions," Abstract Central, 1 page (undated).

Perro, A. et al., "Design and Synthesis of Janus Micro- and Nanparticles," The Royal Soc. of Chem., vol. 15, pp. 3745-3760 (2005).

Response filed on Mar. 3, 2010 to Non-Final Office Action dated Feb. 3, 2010 for U.S. Appl. No. 12/137,121 (U.S. Pub. No. 2008/0242774).

Response filed on Oct. 19, 2010 to Non-Final Office Action dated Sep. 22, 2010 for U.S. Appl. No. 12/506,712 (U.S. Pub. No. 2010/0015447).

Rodenberg, E.J. et al., "Peptides Derived from Fibronectin Type III Connecting Segments Promote Endothelial Cell Adhesion but Not Platelet Adhesion: Implications in Tissue-Engineered Vascular Grafts," Tissue Engineering, vol. 13, No. 11 pp. 2653-2665 (2007).

Roh, K. et al., "Biphasic Janus Particles with Nanoscale Anisotrophy," Nature Materials, vol. 4, pp. 759-763 (2005).

Roh, K. et al., "Triphasic Nanocolloids," J. Am. Chem. Soc., vol. 128, pp. 6796-6797 (2006).

Rosell-Llompart, J. et al., "Generation of Monodisperse Droplets 0.3 to 4 μm in Diameter from Electrified Cone-Jets of Highly Conducting and Viscous Liquids," J. Aerosol Sci., vol. 25, No. 6, pp. 1093-1119 (1994).

Shepherd, R. F. et al., "Microfluidic Assembly of Homogeneous and Janus Colloid-Filled Hydrogel Granules," Langmuir, vol. 22, pp. 8618-8622 (2006).

Shin, Y. M. et al., "Electrospinning: A whipping fluid jet generates submicron polymer fibers," Appl. Phys. Lett, vol. 78, No. 8, pp. 1149-1151 (2001).

Sun, Q. et al., "Design of Janus Nanoparticles with Atomic Precision," 2008 APS Mar. meeting (Mar. 13, 2008).

Sun, Z. C. et al., "Compound Core-Shell Polymer Nanofibers by Co-Electrospinning," Adv. Mater., vol. 15, No. 22, pp. 1929-1932 (2003).

Takei, H. et al., "Gradient Sensitive Microscopic Probes Prepared by Gold Evaporation and Chemisorption on Latex Spheres," Langmuir, vol. 13, No. 7, pp. 1865-1868 (1997).

Ulrich, K. et al., "Polymeric Systems for Controlled Drug Release," Chem. Rev., vol. 99, pp. 3181-3198 (1999).

Zeleny, J., "Instability of electrified liquid surfaces," Phys. Rev., vol. 10, No. 1, pp. 1-6 (1917).

Moffat, Kristen L. et al., "Novel Nanofiber-Based Scaffold for Rotator Cuff Repair and Augmentation," Tissue Engineering: Part A, vol. 15, No. 1, pp. 115-126 (Jan. 2009). (Published Online Sep. 13, 2008).

Moffat, Kristen L. et al., "Orthopedic Interface Tissue Engineering for the Biological Fixation of Soft Tissue Grafts," Clin. Sports Med., vol. 28, No. 1, pp. 157-176 (Jan. 2009).

The International Search Report and Written Opinion of the International Searching Authority issued on Jan. 13, 2011 in related International Application No. PCT/US2010/032971 (Publication No. WO/2010/127119).

X., Mo et al., "PCL-PGLA composite tubular scaffold preparation and biocompatibility investigation," Int. J. Artif. Organs, vol. 29, No. 8 pp. 790-799 (Aug. 2006). Abstract Only.

* cited by examiner

Confocal Laser Scanning Micrographs of BBMPs: Fibers

Confocal Laser Scanning Micrographs of BBMPs: Rods

Confocal Laser Scanning Micrographs of BBMPs: Spheres

Confocal Laser Scanning Micrographs of BBMPs: Discs

Scanning Electron Micrographs of
BBMPs: Rods

Scanning Electron Micrographs of
BBMPs: Discs

Scanning Electron Micrographs of
BBMPs: Fibers

Scanning Electron Micrographs of
BBMPs: Spheres

METHODS FOR FORMING BIODEGRADABLE NANOCOMPONENTS WITH CONTROLLED SHAPES AND SIZES VIA ELECTRIFIED JETTING

CROSS-REFERENCE TO RELATED APPLICATIONS

This application is a continuation-in-part of U.S. Utility patent application Ser. No. 11/272,194 filed on Nov. 10, 2005, now U.S. Pat. No. 7,767,017, which claims the benefit of U.S. Provisional Application Ser. No. 60/626,792, filed on Nov. 10, 2004 and the benefit of U.S. Provisional Application Ser. No. 60/651,288, filed Feb. 9, 2005. This application also claims the benefit of U.S. Provisional Application No. 60/982,389 filed on Oct. 24, 2007. The entire disclosures of each of the above applications are incorporated herein by reference.

FIELD

The present disclosure relates to the fabrication of microparticles and, more particularly, to methods of fabricating polymer-based biodegradable multiphasic nano-components.

BACKGROUND

The statements in this section merely provide background information related to the present disclosure and may not constitute prior art.

There is increasing interest in precise control of particle shape and size for micro-particles and nano-particles in various applications including controlled drug delivery, cell-particle interactions, and biosensors. Until recently, research in these areas has focused primarily on spherical particles. It would be desirable to have a process providing a high selectivity and yield for creating multi-phase nano-components or microparticles having desired shapes, sizes, phase distribution, distribution geometry, and the like.

SUMMARY

This section provides a general summary of the disclosure, and is not a comprehensive disclosure of its full scope or all of its features.

In various aspects, the present disclosure provides a method of making a multiphasic nano-component that comprises forming a plurality of nano-components having a high shape selectivity via an electro hydrodynamic jetting process. In certain aspects, such a shape is selected from the group consisting of: discs, rods, spheres, toroids, fibers, and combinations thereof. The method includes jetting two or more liquid streams together and passing them through an electric field generated by electrodes sufficient to form a cone jet that forms the plurality of nano-components. Each nano-component respectively has a first phase and at least one distinct additional phase. In certain variations, at least one of the phases comprises a polymer, such as a polyester polymer selected from the group consisting of polylactides, polyglycolides, co-polymers, derivatives, and combinations thereof. The forming further includes controlling one or more of: concentration of the polymer in the liquid streams, flow rate of the liquid streams, humidity, temperature, design of the electrodes, and configuration of the electrodes during jetting.

In yet another aspect, a method of making a multiphasic nano-component comprises forming a plurality of nano-components by jetting two or more liquid streams together and passing them through an electric field generated by electrodes sufficient to form a cone jet. Each respective nano-component has a first phase and at least one additional distinct phase, where at least one of the phases comprises a polymer. The forming of the plurality of nano-components includes controlling one or more of: concentration of the polymer in the liquid streams, flow rate of the liquid streams, humidity, temperature, design of the electrodes, and configuration of the electrodes during the jetting to form at least about 50% of the plurality of nano-components having substantially the same shape, size, and/or orientation of the first phase or the at least one additional phase.

In yet other aspects, a method is provided by the present disclosure for making a multiphasic nano-component comprising forming a plurality of nano-components by jetting two or more liquid streams together and passing them through an electric field generated by electrodes sufficient to form a cone jet. Each respective nano-component has a first phase and at least one additional phase distinct from the first phase. At least one of the phases comprises a polymer, such as a polyester polymer selected from the group consisting of polylactides, polyglycolides, co-polymers, derivatives, and combinations thereof. The forming of the plurality of nano-components includes controlling one or more of: concentration of the polymer in the liquid streams, flow rate of the liquid streams, humidity, temperature, design of the electrodes, and configuration of the electrodes during jetting to form at least about 50% of the plurality of nano-components having substantially the same shape.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

" FIG. 6A shows discs, FIG. 6B shows spheres, and FIGS. 6C and 6D show rods;

DETAILED DESCRIPTION

Figure 1A:
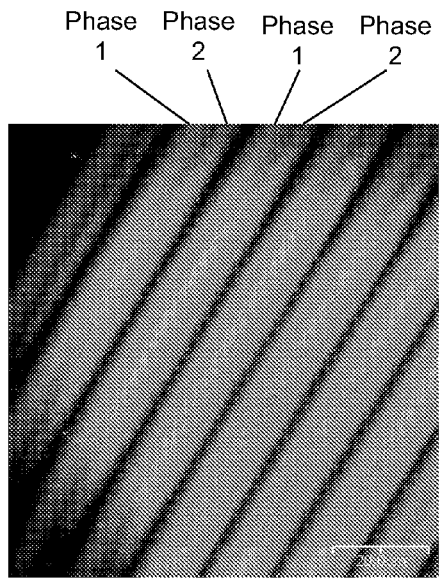
FIGS. 1A, 1B, 1C and 1D are exemplary Confocal Laser Scanning Micrographs (CLSM) of multiphasic nano-components formed according to various principles of the present teachings having different shapes: fibers, rods, spheres, and discs, respectively.

The following description is merely exemplary in nature and is not intended to limit the present disclosure, application, or uses.

Control of certain variables for nano-components can be important for various applications. For example, controlling shape, anisotropy, phase distribution and orientation, as well as biodegradability, are important aspects for forming nano-components. Control over such variables impacts the successful design and manufacture of improved systems to solve problems in drug delivery, cell-particle interactions, and biosensors, including the study of cell adhesion and cell spreading, and multiple drug carriers with a reduced initial burst release, by way of non-limiting example. While there have been a few studies on shape control of monophasic particles, no processes have provided control of particle shape via electrospraying, in particular control over multiphasic nano-components formed by electrospraying.

The present teachings pertain to methods of forming multiphasic nano-components that provide the ability to have a high degree of control or selectivity with respect to at least one of: shape, size, and orientation of a first phase and/or at least one additional phase when forming a plurality of nano-components via electrospraying techniques described herein. In certain aspects, the present teachings provide the ability to create distinct shapes, morphologies, or phase orientation in nano-components. This is particularly desirable, since the methods of the present disclosure provide control during processing that generates a large yield of substantially the same nano-components during processing. Such capability provides advantages during potential scale-up and commercialization, particularly since nano-components formed in accordance with the present disclosure are generally made from the same materials and use the same or similar solvent systems. Furthermore, device set-up and implementation for these techniques is relatively simple to fabricate.

In various aspects, the present disclosure provides methods of making multiphasic nano-components, which comprise forming a plurality of nano-components having a high selectivity with respect to at least one of: shape, size, and orientation of a first phase and/or at least one additional phase. Such methods include jetting two or more liquid streams together and passing them through an electric field generated by electrodes sufficient to form a cone jet that forms the plurality of nano-components.

Each nano-component respectively has a first phase and at least one additional phase distinct from the first phase. In certain aspects, at least one of the phases comprises a polyester polymer selected from the group consisting of polylactides, polyglycolides, co-polymers, derivatives, and combinations thereof, as will be described in more detail below. Further, the method includes controlling one or more of: concentration of the polymer in the liquid streams, flow rate of the liquid streams, humidity, temperature, electrode design, and configuration of electrodes during the jetting process, which provides a high selectivity of particles having substantially the same shape, size, and orientation of a first phase and/or at least one additional phase. For example, in certain aspects, concentration of polymer and flow rates of the liquid streams are two significant variables controlled in certain aspects of the present methods to provide a plurality of nano-particles having substantially the same shape, size, or phase orientation. In other aspects, the electrode geometry and configuration during the electrospraying process is employed to control nano-component size, shape, selectivity, and distribution.

In certain aspects, the plurality of nano-components formed in accordance with the present methods, includes controlling certain parameters during jetting to provide nano-components having a predetermined shape selected from the group consisting of: disks, rods, spheres, rectangles, polygons, toroids, cones, pyramids, cylinders, fibers, and combinations thereof. Nano-fibers generally have an elongated axial dimension that is substantially longer than the other dimensions of the nano-fiber.

A "nano-component" is a material that has a variety of shapes or morphologies; however, generally has at least one spatial dimension that is less than about 50 μm (i.e., 50,000 nm). The term "nano-sized" or "nanometer-sized" is generally understood by those of skill in the art to mean less than about 50 μm (i.e., 50,000 nm), optionally less than about 10 μm (i.e., 10,000 nm), optionally less than about 2 μm (i.e., less than about 2,000 nm), optionally less than about 0.5 μm (i.e., 500 nm), and in certain aspects, less than about 200 nm. Such nano-components are intended to encompass components having a micro-scale, so long as at least one dimension of the particle or fiber is less than about 50 μm, thus reference to nano-components also includes micro-components, in certain embodiments. In certain aspects, a nano-component as used herein has at least one spatial dimension that is greater than about 1 nm and less than about 50,000 nm (50 μm). In certain aspects, a nano-component has at least one spatial dimension of about 5 to about 5,000 nm. In some aspects, at least one spatial dimension of the nano-component is about 20 to about 2,000 nm. In still other variations, nano-components have at least one spatial dimension of about 50 to about 500 nm. A "nano-particle" generally refers to a nano-component where all three spatial dimensions are nano-sized and less than or equal to several micrometers (e.g., less than about 10,000 nm).

By the term "phase" it is meant that a portion of a nano-component is chemically and/or physically distinct from another portion of the nano-component. The multiphasic nano-components according to the present teachings include a first phase and at least one phase that is distinct from the first phase. In certain aspects, the multiphasic components of the present disclosure include multiple distinct phases, for example three or more distinct phases. In some aspects, each respective phase occupies a spatially discrete region or compartment of the nano-component. In certain aspects, each respective phase of the multiphasic component is exposed to an external environment, thus providing exposure of the respective phase surfaces of the multiphasic component to an external environment. The exposure of each respective surface of each phase provides enhanced environmental interface and optimum diffusion or material transfer, resulting in increased bioavailability to target regions. Three or more phases are also contemplated by the present teachings as well. In certain aspects, nano-components comprise materials in a solid phase or a semi-solid phase, although liquid phases are contemplated in certain variations.

In accordance with various principles of the present disclosure, certain variables can be manipulated and controlled during electrospraying to control processes that form multiphase nano-components, which provide one or more of the following: high selectivity of specific nanoparticle shapes, high selectivity of nanoparticle size, and desirable distribution geometry. By "high selectivity" it is meant that a high yield of multiphasic nano-components are formed, where at least about 50% of the plurality of nano-components have substantially the same shape, size, and/or orientation of phases with the nano-component. In certain aspects, the high selectivity during formation corresponds to at least about 70% of the plurality of nano-components each respectively having substantially the same shape, size, and/or orientation of phases; optionally at least about 75%, optionally at least about 80%, optionally at least about 85%, optionally at least about 90%, optionally greater than about 95%, and in certain aspects, greater than or equal to about 97% share substantially the same shape, size, and/or phase orientation. By "substantially" the same shape, size, and orientation of a first phase and/or at least one additional phase, it is meant that the plurality of nano-components share common features of such an attribute, for example shape or size, although such nano-components may deviate slightly from the median or average shape, size, and the like that are formed, but would still be recognized as having such an attribute or feature. For example, while a high selectivity of the plurality of nano-components has substantially the same particle size, for example, an average diameter of 100 nm, the plurality of particles are monodisperse (greater than 50% have a particle size near the average particle diameter), but may deviate from the average diameter by less than about 25%, optionally about 5 to about 20%, as is recognized by those of skill in the art and will be discussed in more detail below.

In accordance with certain aspects of the present teachings, electrified jetting is used to create multiphasic nano-particles having a shape selected from the group consisting of: disks, rods, spheres, rectangles, polygons, toroids, cones, pyramids, cylinders, fibers, beads-on-a-string and combinations thereof. In certain aspects, each respective nano-component has a shape selected from the group consisting of: discs, rods, spheres, fibers, and combinations thereof. Such nano-components are made with a controlled shape by varying solution concentration and process parameters, such as humidity, temperature, and pressure, as well as polymer mass flow rate during jetting. Thus, the methods of the present disclosure can create spherical, discoid, rod-like, and fiber nano-components (e.g., microparticles) from certain polymer systems thereby demonstrating simultaneous control over shape as well as anisotropy at microscale.

Electrified jetting is a process that develops liquid jets having a nano- and micro-sized particle diameter, using electrohydrodynamic forces. When a droplet of electrically conductive solution is exposed to an electric potential (for example, on the order of a few kilovolts), the balance of forces between the electric field and surface tension causes the meniscus of the droplet to distort into a conical shape, called the Taylor cone. Above a specific critical potential value, a highly charged liquid jet is ejected from the apex of the cone. As provided by the present disclosure, a large number of solution and process variables can be manipulated to yield a variety of shapes and sizes of particles in this manner.

With reference to FIGS. 3 and 4, schematics illustrating a side-by-side electrojetting apparatus implementing a variation of the method of the disclosure are provided using polymer solutions or melts as jetting liquid streams. FIG. 3 is a schematic of an exemplary electrojetting apparatus where two jetting liquids are combined to form multi-biphasic nano-component particles 148. FIG. 4 illustrates a variation of an electrojetting apparatus where two jetting liquids are combined to form nano-fibers when polymer solutions or melts are used as jetting liquids, fibers 458 are obtained.

In FIG. 3, a "side-by-side" configuration of Fluids A and B 100, 102 are combined to form a pendant droplet 104 of conducting liquid. The drop 104 is exposed to an electric potential 142 of a few kilovolts, where the force balance between electric field and surface tension causes the meniscus of the pendent droplet 104 to develop a conical shape, the so-called Taylor cone (not shown). Above a critical point, a highly charged liquid jet is ejected from an apex of the cone. In this variation, ejected composite stream 128 is fragmented due to instabilities thereby forming a spray of droplets. Thus, in electrospraying, the ejected liquid jet is eventually fragmented due to instabilities and forms a spray of droplets.

In order to incorporate two different components in each side of the composite stream 128, channels 130, 132 are configured adjacent to each other (i.e., side by side) in nozzle 134. A syringe pump 160 is used to drive the liquids in nozzle 134. In some variations, channels 130, 132 are capillaries. Channels 130, 132 feed two different jetting liquid streams 136, 138 into region 140 having an electric field generated by power supply 142. Channels 130, 132 are of sufficient dimensions to allow contacting of liquids streams 136, 138 to form composite stream 144. In one variation, this electric field is generated by the potential difference between nozzle 134 and plate 146. Typically, an electric field is formed by applying a potential difference between at least two electrodes from about 0.1 kV to about 25 kV. Various configurations of plates and geometries (electrodes) may be used to generate the electric field as known to those of skill in the art and are contemplated by the present disclosure.

As schematically presented in FIGS. 3 and 4, the biphasic jet which is ejected by the stable biphasic cone can be either fragmented to biphasic nanodroplets or can solidify into biphasic nanofibers. The two phases, i.e., the two jetting liquid streams (or solutions), are optionally compatible with each other (e.g., miscible or soluble) or in certain alternate variations are incompatible. Where the two polymer solutions are compatible each other, a stable cone-jet forms a stable interface between the two phases. In such situations, it is believed that the process is kinetically controlled (rather than thermodynamically controlled), resulting in one phase being trapped in each side before they mix with the other phase.

Since the electrified jetting methods are related to electrohydrodynamic processes, the properties of the jetting liquid and operating parameters are interrelated. Moreover, when the jetting liquids are not one-component systems (i.e., mixtures of two or more compounds), the jetting liquid is a solution having properties governed by several parameters of the solvent and solutes. It should be appreciated that liquid properties, solution parameters, and operating parameters are related, as recognized by those of skill in the art. Relevant material properties include viscosity, surface tension, volatility, thermal and electrical conductivity, dielectric permittivity, and density. Relevant solution properties include polymer concentrations, molecular weight of polymer, solvent mixtures, surfactant(s), doping agent(s), and cross-linking agent(s).

Relevant operating parameters include flow rate of the liquid streams, electric potential, temperature, humidity, and ambient pressure. With regard to the operating parameters, the average size and size distributions of the droplets in electrospraying with cone-jet mode is generally dependent on the flow rate (pumping rate of the jetting liquids).

At a fixed flow rate, one or several relatively monodisperse classes of nano-component diameters are formed. At minimum flow rate, the modality of the distributions and diameter of the droplet itself also show their minima. When the flow rate is changed, the electric field can be adjusted by changing either distance or electric potential between the electrodes in order to sustain a stable cone-jet mode. Higher flow rates may be accompanied by a higher electrical field applied for mass balance of jetting liquids. When the diameter of droplets is larger than desired, solvent evaporation does not fully occur before the droplets reach the collecting substrate, so the resulting droplets may be wet and flat.

In various aspects, the methods of forming such multiphasic nano-components have a high selectivity (e.g., a high yield), which corresponds to forming greater than 50%, optionally at least about 70% of the plurality of nano-components so that they have substantially the same shape, size, and/or orientation of phases. Morphological control can be achieved with the exemplary electric jetting formation methods described herein. In various aspects, methods are provided which make a multiphasic nano-component that includes forming a plurality of nano-components by jetting two or more liquid streams together to form a mixed liquid stream that passes through an electric field generated by electrodes. The electric field is sufficient to form a cone jet, where a plurality of nano-components each respectively has a first phase and at least one additional phase distinct from the first phase. Further, at least one of the phases comprises a polymer. The forming of the plurality of nano-components has a high selectivity with respect to at least one of: shape, size, and orientation of the first phase and/or the at least one additional phase. Such a high selectivity is achieved by controlling one or more of: polymer concentration in the liquid streams, flow rate of the mixed liquid stream, humidity, temperature, pressure, electrode design, and configuration of electrodes.

In certain aspects, the process dependent variables which are used to control particle shape to arrive at a predetermined multiphasic nano-component shape, include, but are not limited to, concentration of polymers in and conductivity of the respective jetting solutions, as well as flow rates of the jetting streams. The concentration of a polymer (along with other components) in a solution/jetting stream influences the viscosity, as does the molecular weight of the polymer (and other components, where present). Solvents or vehicles used in the jetting solution impact the dielectric constant of a respective jetting stream, viscosity, and vapor pressure. The flow rate of the jetting liquid stream relates to vapor pressure and stability of the jet formed. In certain aspects, the distance between a collector and a needle tip impacts the strength of the electric field applied, which in turn can impact the stability of the cone, as well as the cone shape itself and thus voltage, formed during jetting. Generally, so long as a stable cone jet is formed via correct distance between the electrode and the nozzle/needle tip, this variable does not have a significant impact on nano-component particle shape. Temperature, pressure, and humidity likewise impact the behavior of the jetting fluids and shapes formed, impacting solvent volatilization and applied voltage, for example.

In certain aspects, to produce fine droplets, the jetting liquids are fragmented before they solidify. For this purpose, jetting liquids can be a relatively dilute polymer solution with extensional viscosity that does not show much strain hardening. However, depending on the molecular weight of the polymer, this concentration range may sometimes be too low for particle production. Accordingly, in some variations, an alternative is to use low molecular weight compound as the jetting liquid. In such variations, the droplets are in a liquid phase at the point of collection. Accordingly, the appropriate sol-gel chemistry is necessarily employed after or during the process of jetting. In some variations, the resultant nano-object of the jetting is cross-linked thereby having an insoluble network structure. The cross-linking reaction of the prepolymer (e.g., monomers, oligomers, and the like) will be initiated by an appropriate method (e.g., thermal initiation or UV illumination).

Figure 5:
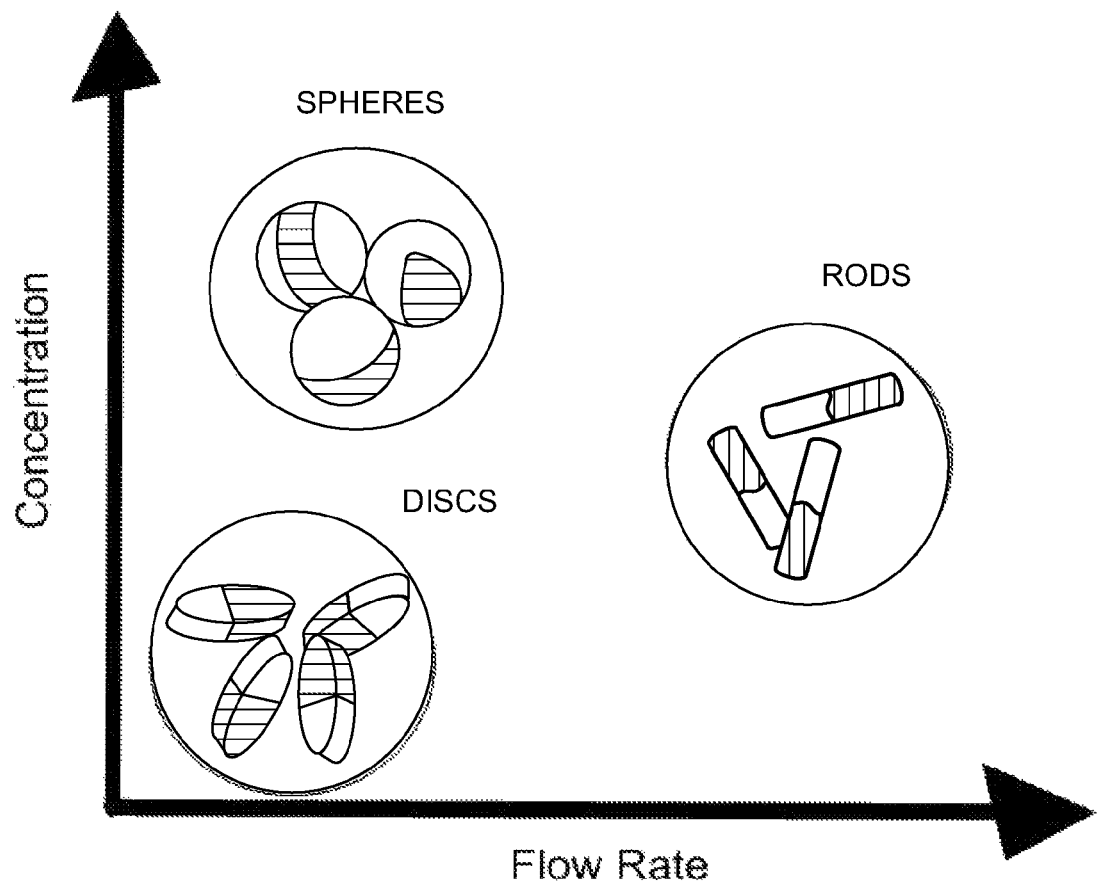
FIG. 5 shows the relationship between flow rate and concentration on nano-component shapes during electrified jetting of a poly(lactide-co-glycolide) polymer (PLGA) in accordance with the principles of the present disclosure.

For example, in a system having PLGA polymer in the respective jetting solutions, two process parameters which control nano-component shape are polymer concentration in solution and common (mixed stream) flow rate, as shown in FIG. 5. As can be seen in FIG. 5, electrified jetting at relatively low polymer (e.g., PLGA) concentrations and low flow rates produces discs. As appreciated by those of skill in the art, the specific concentrations and flow rates that create the different morphologies may differ depending upon the polymer system selected, as well as other conditions during set-up, including temperature, pressure, humidity, so that the following values discussed in the context of the PLGA polymer are exemplary.

For example, in accordance with certain embodiments of the present disclosure, low concentrations of polymer in a solvent/vehicle (for example, about 0.5 to about 2% w/w) used during electrified jetting produces discs. In one embodiment, a concentration of 1.3 weight % PLGA in each phase creates disc shapes at flow rates below about 2 mL/h. Relatively high concentrations (for example, about 4% w/w and greater) produce spherical particles. For example, a concentration of 4.5 weight % PLGA in each phase creates sphere shapes. Since the cone solidifies at lower flow rates when using a higher polymer concentration in solution, a relatively higher flow rate is typically desired, for example greater than or equal to about 2 mL/hour to form spheres. At slightly higher flow rates, the cone is more stable; however, the particle size of the spheres increases. Thus, in the regime where polymer concentration is greater and flow rates remain relatively low, spheres are formed. Where polymer concentration is lower and flow rates remain relatively low, discs are formed.

When a polymer concentration is intermediate (for example, between a concentration that forms discs and a comparative concentration that forms spheres) and a higher flow rate is selected, rods are thus formed. For example, flow rates of about 0.4 to about 0.7 mL/h and PLGA concentrations of about 3.0 to 4.0 weight % form rod shapes, optionally about 3.5 to about 3.75 weight % and in certain embodiments, 3.6 wt. % PLGA. Even higher concentrations of jetted polymer form fibers. If flow rate is lower or intermediate for the same high concentration that forms fibers, spheres are formed instead. Furthermore, in accordance with the present teachings, the size of discs and spheres can be controlled by varying flow rate. In one aspect, particle size increases with increasing flow rate for a given operating regime for a shape, where the polymer concentrations are equivalent.

In certain aspects, rods are produced by closely controlling polymer concentration, flow rate and conductivity. For example, rods can be formed via the present methods by using relatively high flow rates during electrojetting and using an intermediate polymer concentration. In this example, rods are formed at higher concentrations and at relatively low flow rates. Here, the particles are produced at room temperature and pressure.

In certain aspects, multiphasic nanoparticles can in accordance with such techniques are made with high shape selectivity. In certain aspects, shape selectivity can range from about 50 to 100%, optionally from about 70 to 99.5%, optionally about 85 to 99%, and in certain aspects, greater than or equal to about 90% up to 100%. The plurality of nano-components formed in this manner may have a shape selected from the group consisting of: disks, rods, spheres, rectangles, polygons, toroids, cones, pyramids, cylinders, fibers, and combinations thereof. In certain aspects, each respective nano-component has a shape selected from the group consisting of: disks, rods, spheres, fibers, and combinations thereof. Particularly significant variables to control during electrojetting in accordance with the present methods to create multiphasic nano-components having desired morphology are the concentration of polymer in the liquid stream (and/or overall viscosity of the liquid stream based on all components present therein), as well as flow rate of the jetting liquid stream.

Figure 10:
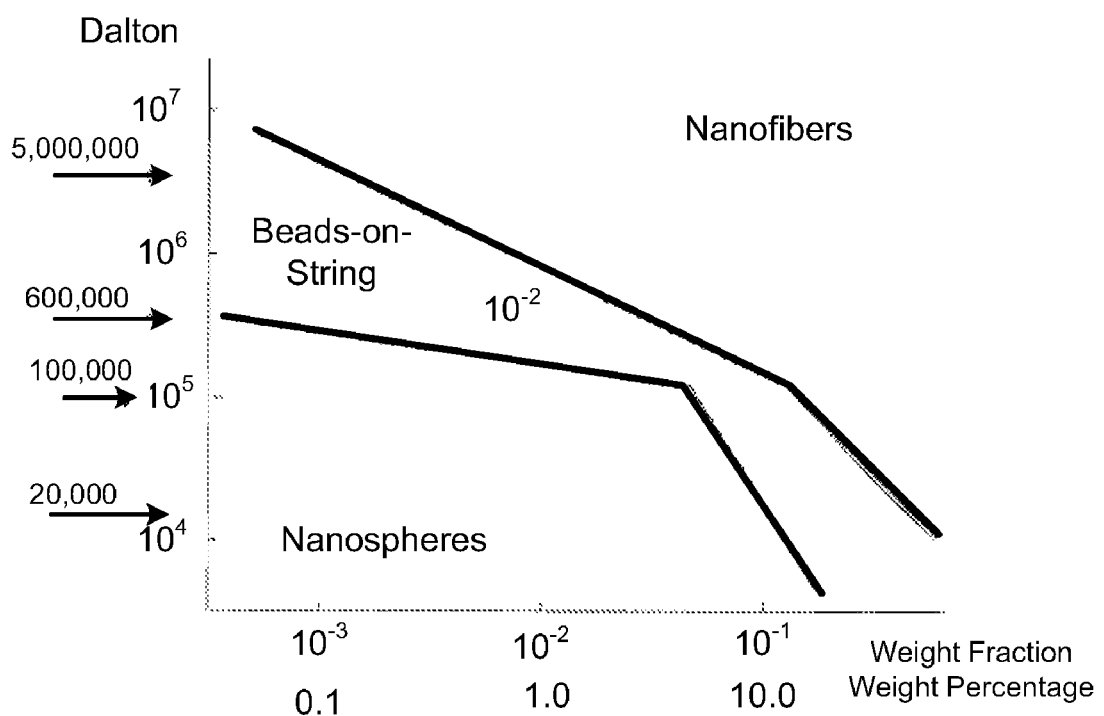
FIG. 10 is a diagram showing the relationship of molecular weight and concentration to morphology.

FIG. 10 demonstrates how nano-component morphology can be controlled by changing two independent solution parameters (concentration and molecular weight of the structural polymer). Here, use of higher concentrations and larger molecules makes viscosity of the jetting solution higher so that the resulting morphology becomes more fibrous. For the same jetting liquids, use of different operating parameters also changes the resulting morphology. The possible geometry of the nano-components thus includes various spherical nano/micro-particles, ellipsoidal particles, nano/micro-rods, beads-on-a-string, nano-fibers, by way of example.

Figure 1B:
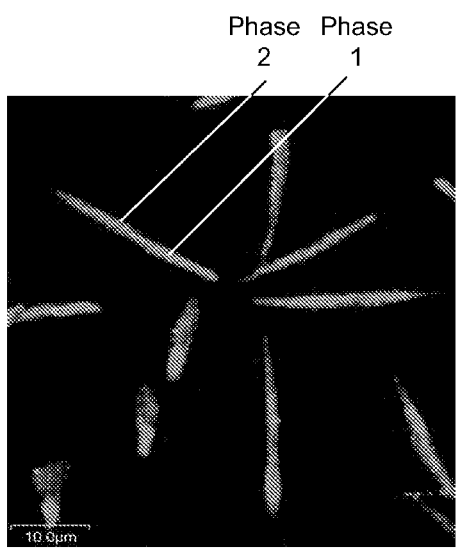
Figure 1C:
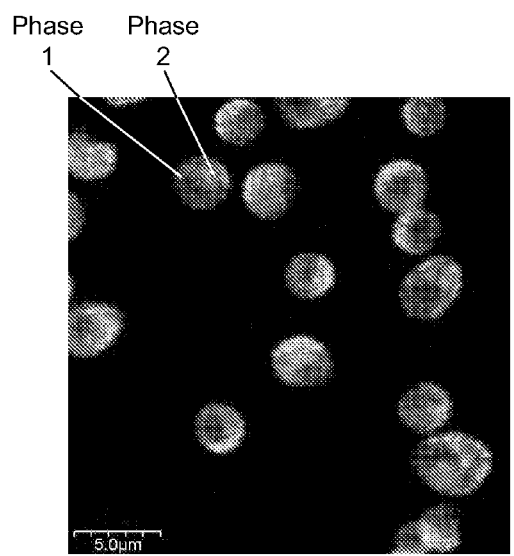
Figure 1D:
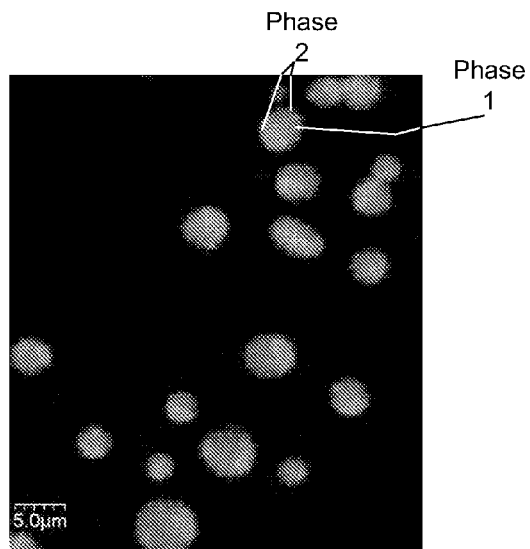
Figure 2B:
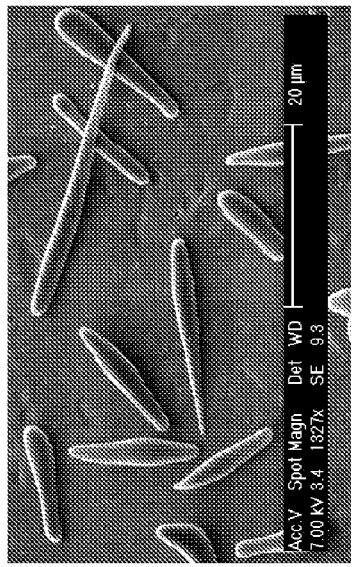
FIGS. 2A, 2B, 2C and 2D are exemplary Scanning Electron Micrographs (SEM) formed according to various principles of the present teachings depicting different shapes: fibers, rods, spheres, and discs, respectively.
Figure 2D:
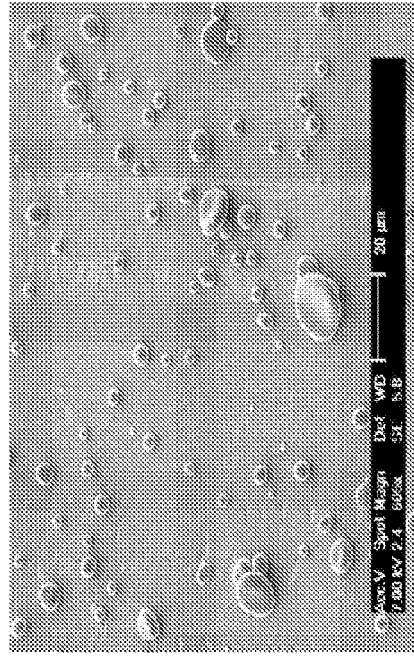
Figure 2A:
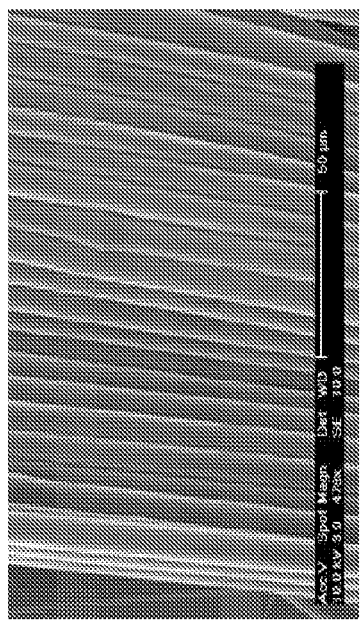
Figure 2C:
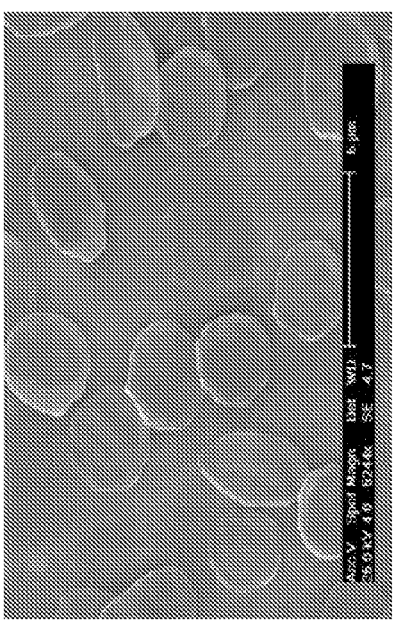

As discussed above, the present methods also provide the ability to control phase alignment in the multiphasic nano-components. In certain aspects, biphasic fiber alignment is believed to result from a combination of controlling each jetting stream flow rates and polymer concentration. In certain conditions, anisotropic phase orientation is controlled, as desired. The respective orientation of phases in the nano-component is also controlled during the formation process, so that in certain aspects, the phases are aligned along a major axis. In other aspects, two phases may be diametrically opposed to one another along a major axis of the particle. In certain aspects, a plurality of nano-components formed in accordance with the present teachings have a shape selected from rods and/or fibers, wherein each nano-component of the plurality has a major axis so that respective major axes of each of the plurality of nano-components are substantially aligned in a first orientation. See e.g., FIGS. 1A, 2A, and 8A-8C and 8E-8G. In certain embodiments, a first phase and at least one additional phase are also aligned in a first orientation along the major axis for each nano-component of the plurality, so that the fibers or rods are aligned, as are the phases of the nano-components. See e.g., FIGS. 1A, 2A, and 8A-8C and 8E-8G. Cross-sections of the plurality of fibers are also shown for various examples, FIG. 8D shows a cross-section of the plurality of biphasic fibers in FIG. 8C, FIG. 8H is a cross-section of the triphasic fibers of FIG. 8E, the cross-sectional view of triphasic fibers of FIG. 8F is shown in FIG. 8J, and that of FIG. 8G in FIG. 8K. FIG. 8L shows a cross-section of tetraphasic fibers and FIG. 8K another cross-section of tetraphasic fibers having a diamond shaped orientation (formed by a diamond shaped orientation of needles for jetting. In yet other aspects, a plurality of nano-components is formed having a shape selected from rods and/or fibers, where the first phase and at least one additional phase are diametrically opposed to one another along an axial direction of the nano-component. FIGS. 1B and 9C.

Moreover, the present disclosure further provides the ability to create aligned fibers on a substrate. While a variety of techniques have been conventionally employed to produce aligned fibers, such as the collecting fibers on a rotating wheel, introducing an insulating gap, applying alternating current, or rapidly oscillating a grounded frame within a jet, the present methods provide a relatively simple technique to form aligned fibers, without requiring extensive additional setup or equipment. In certain aspects, the present disclosure provides a method of producing aligned nano-components in a fiber or rod shape, based solely on manipulating solution properties that are being jetted; however, does not require any other external changes in the jetting setup. Thus, where the nano-components are in the form of fibers, a plurality of such fibers can be formed having alternate alignment with respect to individual phases. In certain aspects, a plurality of nano-components are thus formed in accordance with the present teachings having a shape selected from rods and/or fibers, where each nano-component of the plurality has a major axis so that respective major axes of each of the plurality of nano-components are substantially aligned in a first orientation. See e.g., FIGS. 1A, 2A, and 8A-8M. In certain embodiments, a first phase and at least one additional phase are also aligned in a first orientation along the major axis for each nano-component of the plurality, so that the fibers or rods are aligned, as are the phases of the nano-components. Coupled with their unique, alternating phase alignment, the nano-component fibers provided by the present teachings can be utilized for a host of applications such as microfluidics, tissue engineering scaffolds, and the like.

Additional control of the size of multiphasic nano- and microparticles can be achieved by superimposing the electrical field used for driving the electrohydrodynamic jetting with an oscillating field. Oscillating fields include, but are not limited to electric fields, mechanical fields, magnetic fields, or thermal pulses. Alternatively, a perturbation of the initial jet may be generated by jetting through a region with an oscillating electric field that deforms, interrupts, or deflexes the jet comprising the mixed liquid stream. This method can result in multiphasic micro- and nanoparticles with monodisperse sizes. Monodisperse generally refers to size distributions that deviate less than about 25%, optionally less than about 20%, optionally less than about 15%, optionally less than about 10%, optionally less than about 5%, and in some aspects, less than about 1%.

In certain aspects, particles made in accordance with the present techniques can be made that range in significant ways with respect to particle sizes and particle size distribution. In certain embodiments, typical particle sizes produced via the processes described in the present disclosure, range from about 50 nm to about 50,000 nm, optionally from about 200 to about 10,000 nm, and in certain aspects, optionally from about 500 nm to about 3,000 nm.

Figure 6:
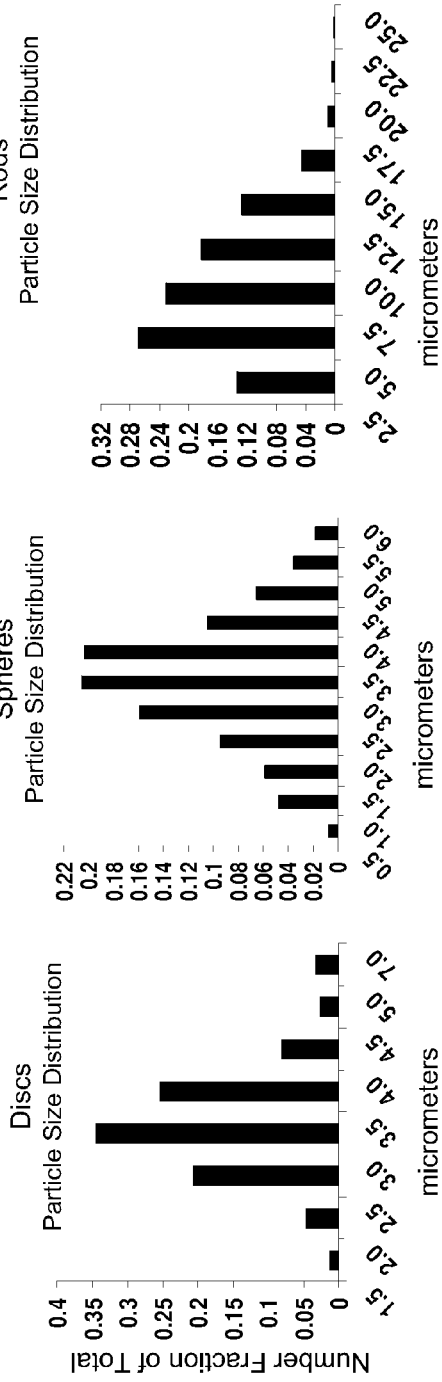
FIGS. 6A through 6D are size distribution data of nano-component particles formed in accordance with the present disclosure, as determined from SEM images where particle size measurements used image processing software "Image J.

As shown in FIG. 6, PLGA multiphasic particle size distributions are shown, as determined via software analysis (Image J) of SEM images. In FIG. 6A, discs having diameter indicate arithmetic mean of values along perpendicular axes through the center. In FIG. 6B, spheres are shown, where about 8.2% of the particles measured are greater than about 6 mm in diameter and are non-spherical, so these particles did not form part of the size distribution profile. In FIGS. 6C and 6D, rods have a diameter measured at the top, middle and bottom of each particle and the arithmetic mean is used to determine an aspect ratio. 72% of the particles are rods (others being spheres), and only rods are considered in the size distribution profile. The number of particles measured is 789, 1170 and 771 for FIGS. 6A, 6B, and 6C, respectively.

By way of example, composite liquid stream 128 which is ejected from the pendant cone can be fragmented to small droplets or sustained and elongated in the form of a continuous fiber. The size of the droplet and diameter of the fibrous jet can also be controlled. Such control is attained by changing either the material properties of jetting liquids or the working parameters of electrified jetting that breaks-up the jet stream. For example, in various aspects of the present teachings, control over one or more of the following variables impacts particle shape or geometry, particle size and particle size distribution, and phase orientation: material composition and conductivity, polymer concentration in the liquid streams, flow rate of the mixed liquid stream, humidity, temperature, pressure during electrohydrodynamic jetting and electrode design, and configuration of electrodes.

In certain aspects, the same biphasic needle setup can result in a range of different shapes. For creating fibers, needle to collector distance is varied. Other configurations include those where a collector is optionally a rotating-wheel assembly covered with Aluminum foil, a microfabricated electrode consisting of one or multiple parts, an electrode that provides sharp edges, a multi-electrode array that is used without bias between individual electrodes, or an multi-electrode array that is used with bias between individual electrodes.

It should be appreciated, however, that the final morphology of the liquid jet is not always the same as those of the solid products collected on the substrates. The shape of final products can also be controlled by a sol-gel transition process or by subsequent processing after formation by electric jetting. When electric jetting is used to multiphasic nano-components in the form of fibers (for example, by electrospinning in FIG. 4), a sol-gel transition can be intrinsic to the process, since the jetting liquids are polymer solutions or polymer melts, and solvent evaporation or a temperature drop below the thermal transition temperature during the jetting acts as a sol-gel treatment step.

In various aspects, the use of the electric jetting methods of the disclosure provide greater control over the morphology and design of the nano-components as opposed to other methods of forming nano-components (such as sonication during liquid jetting and the like). For example, the liquid jetting in the presence of an electric field of the present disclosure permits the use of immiscible materials as the first and second phases, as well as miscible materials. The broad use of such materials is possible due to the rapidity of formation of particles and shapes when an electric field is applied. For many conventional methods of formation, the respective phases require immiscibility between the phases, however that is not a requirement with the electric jetting methods employed here. Further, the methods of forming the multiphasic nano-components by use of side-by-side electric jetting further provides a high degree of control over the ability to create a wide variety of shapes, including fibers and the like.

In various aspects, at least one phase of the nano-component comprises a polymer. In various aspects, such a polymer is a polyester polymer. In certain aspects, suitable polyester biodegradable polymers are generally formed from poly α-hydroxy acids, for example, those selected from the group consisting of polylactides, polyglycolides, co-polymers, derivatives, and combinations thereof. Examples of such poly α-hydroxy acid polymers include polylactic acid (poly(lactide)), polycaprolactone, polyglycolic acid (poly(glycolide)), poly(lactide-co-glycolide) polymer (PLGA), poly(dioxanone), poly(caprolactone), poly(3-hydroxybutyrate), poly (3-hydroxyvalerate), poly(valerolactone), poly(tartronic acid), poly(β-malonic acid), poly[lactide-co-(propargyl glycolide)], copolymers, derivatives, and combinations thereof. One particularly suitable polymer for use with the present methods is poly(lactide-co-glycolide polymer (PLGA), particularly a biodegradable poly(DL lactide-co-glycolide) polymer. By way of example, such poly(lactic co-glycolide) co-polymers may be varied with respect to molecular weight and further can be controlled for a ratio of lactic acid monomer to glycolic acid monomer. In certain example, the molecular weight of a polymer like poly(lactic co-glycolide) may range from about 50 to about 80,000 g/mol. Particularly suitable poly(lactic co-glycolide) co-polymers have a ratio of lactic acid monomer to glycolic acid monomer ranging from about 85:15 to about 15:85, including those polymers have a 50:50 ratio of lactide to glycolide monomers.

In certain embodiments, the liquid streams used for electrified jetting comprise such a polyester polymer, which is typically provided in solution or suspension. Suitable solvents include by way of non-limiting example, water, $C_1$-$C_4$ alcohols, fluorinated alcohols (e.g., hexafluoroisopropanol), chloroform, methylene chloride, ethyl acetate, acetone, acetonitrile, n,n-dimethylformamide (DMF), triethylamine (TEA), and combinations thereof (e.g., 95:5 chloroform:dimethylforamide). As will be described in greater detail below, controlling the concentration of polymer in the liquid stream(s) being jetted, as well as the molecular weight of the polymer in the liquid stream, creates nano-components having a select pre-designated shape.

In certain aspects, such a polymer is present in each respective liquid stream at less than or equal to about 20 weight % of the total liquid stream on a wet basis; optionally at about 0.1 weight % to about 20 weight % of the total liquid stream weight; optionally at about 0.5 weight % to about 18 weight % of the total liquid stream weight; optionally at about 1 weight % to about 15 weight % of the total liquid stream weight; optionally at about 1 weight % to about 6 weight %; optionally at about 1 weight % to about 5 weight %; and in certain aspects, optionally at about 1 weight % to about 4 weight % of the liquid stream on a wet basis, depending on the desired morphology and particle size of the nano-components. The concentration of the polymer in the liquid stream is one factor that controls the shape and size of the nano-component to be formed, as will be discussed in more detail below.

Multiphasic nano-components of the present disclosure can be made of a wide variety of materials in addition to the polyester poly α-hydroxy acid polymers, co-polymers, and derivatives, thereof described above. Other materials which can be included in the liquid jetting streams to form nano-components include inorganic and organic materials. Specifically, various other polymers, such as biodegradable or non-biodegradable polymers, biocompatible polymers, or natural polymers can be included in one or more of the liquid streams that form phases of the nano-component. In one aspect, the first phase of the multiphasic nano-component comprises a first polymer and the second phase comprises a second polymer that is distinct from the first polymer. In certain aspects, one of the first and second polymers comprises a polyester poly α-hydroxy acid polymer, co-polymer, or derivative thereof. Thus, in certain aspects different polymers can be used in at least two phases of the multiphasic nanoparticle composition.

Exemplary polymers suitable for use in the multiphasic nano-components ("MPNs") include biodegradable or non-biodegradable polymers (in addition to the poly(α-hydroxy acid) polymers discussed above), biocompatible polymers, or natural polymers. In certain respects, different polymers used in the different phases of the MPN permit different active ingredient release kinetics, which can be useful in designing release of the active ingredient into the environment.

In certain aspects, multiple phases of the MPN each comprise one or more polymers. In certain aspects, the polymers can also be modified by chemical or physical methods, such as cross-linking, heat treatment, photochemical treatment, and/or changes in the chemical or physical environment. In yet other aspects, the polymer modification occurs in a select portion or region of one or more of the multiple phases, or such polymer modification can occur to different degrees, potentially resulting in different materials or materials responses, as appreciated by those of skill in the art. Such polymer modification and/or treatment provides different release kinetics in certain embodiments for the multiphasic nano-components.

In certain aspects, the phases of the multiphasic nano-components dissolve or disintegrate at different rates. In this regard, the dissolution rate of the respective phases impacts the release rate of an active ingredient that may be present in each phase, thus providing control over the release kinetics and concentration of active ingredient to be delivered to target regions with each respective phase of the nano-component. As referred to herein, "dissolve" refers to physical disintegration, erosion, disruption and/or dissolution of a material. The phases may dissolve or disintegrate at different rates or have different solubility (e.g., aqueous solubility) that impacts the rate of active ingredient release. Each phase comprises one or more materials that dissolve or erode upon exposure to a solvent comprising a high concentration of water, such as serum, blood, bodily fluids, or saliva. In some variations, a phase may disintegrate into small pieces or may disintegrate to collectively form a colloid or gel.

In some aspects, a phase of the multiphasic nano-component comprises a polymer that is insoluble or has limited solubility in water, but is dispersible in water, so that the polymer breaks down or erodes into small fragments. In other aspects, a polymer used in a phase of the multiphasic nano-component is insoluble in water, but is swellable. In variations where a polymer does not fully break down during use, the polymer can be a water-repellant polymer or an aqueous-stable hydrophilic polymer, for example, certain types of cellulose. In various aspects, each phase of the multiphasic nano-components optionally comprises a combination of polymer materials.

In certain aspects, the multiphasic nano-component phase(s) respectively comprise a "pharmaceutically and/or cosmetically acceptable composition" referring to a material or combination of materials that are used with mammals or other organisms having acceptable toxicological properties for beneficial use with such an animal. Pharmaceutically and/or cosmetically acceptable compositions provide polymers and other components that can be safely used in drug and therapeutic compositions, oral care compositions, nutritional compositions, personal care compositions, cosmetic compositions, diagnostic compositions, and the like. In certain aspects, the pharmaceutically and/or cosmetically acceptable composition includes medical devices and implants, or surface films or coatings for such devices. Thus, in various aspects, the multiphasic nano-components may be used in a wide variety of different types of compositions having a biofunctional or bio-active material and are not limited to the variations described herein.

Figure 3:
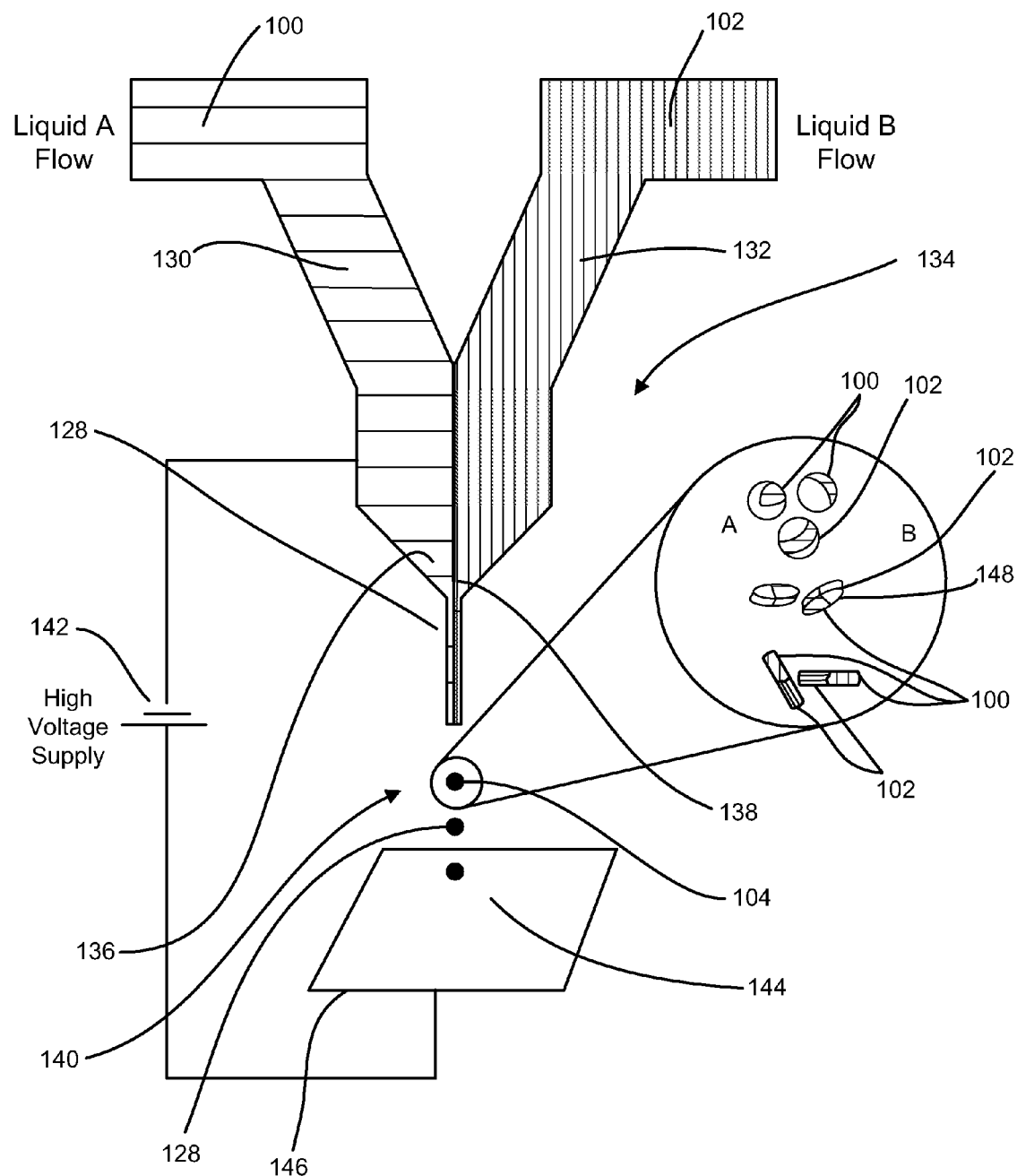
FIG. 3 shows an exemplary apparatus that forms multiphasic nanoparticle compositions according to the present disclosure by electrically jetting fluid in a side-by-side configuration to form discrete multiphasic nano-component solids.
Figure 4:
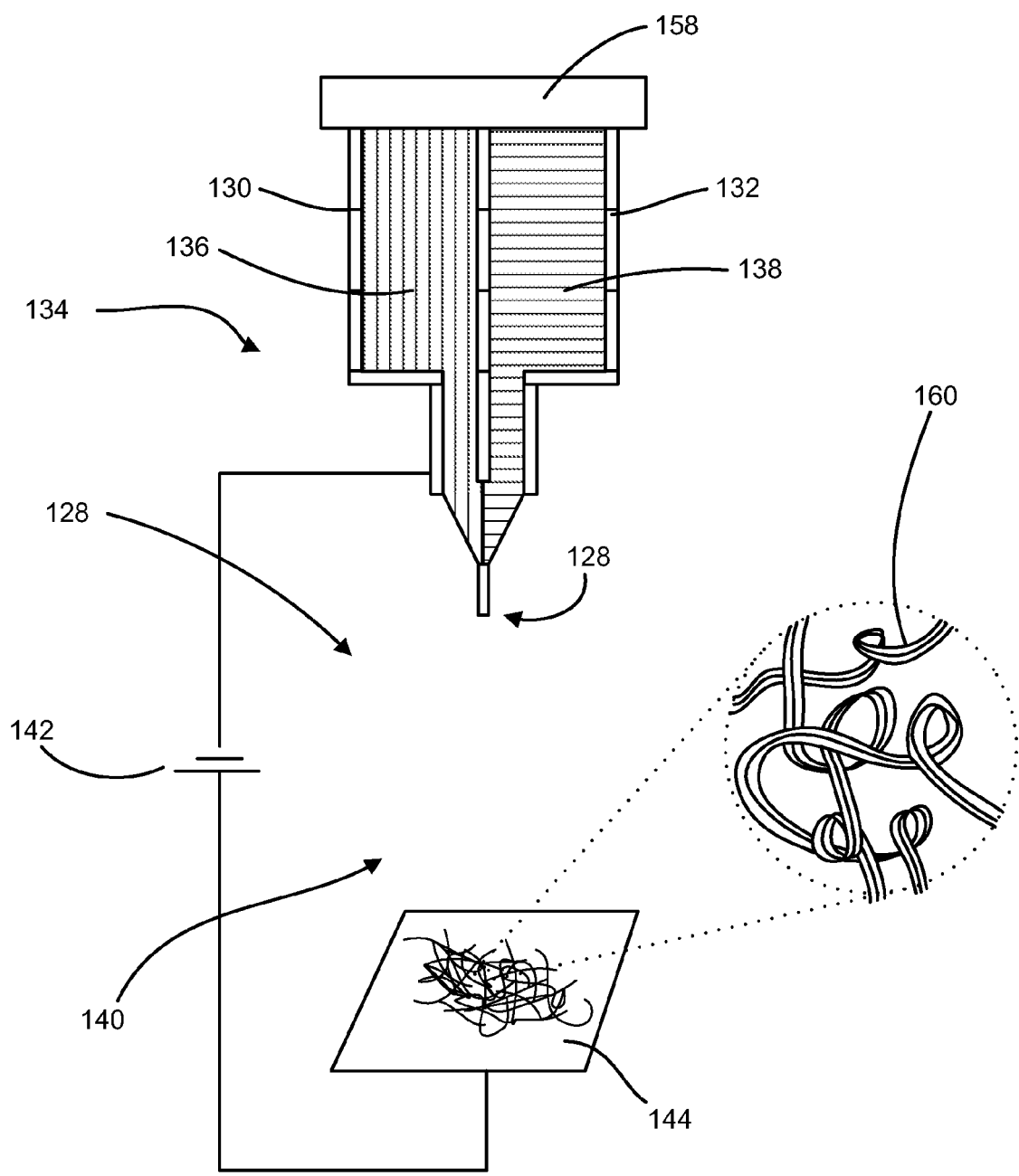
FIG. 4 shows an exemplary apparatus that forms multiphasic nanoparticle compositions according to the present disclosure by electrically jetting fluid in a side-by-side configuration to form multiphasic nano-component fibers.

Non-limiting additional polymers suitable for use in the multiphasic nano-components compositions (e.g., in Fluid A designated 100 or Fluid B designated 102 of FIG. 3 or 4) include sodium polystyrene sulfonate (PSS), polyethers, such as a polyethylene oxide (PEO), polyoxyethylene glycol or polyethylene glycol (PEG), polyethylene imine (PEI), copolymers, derivatives, and combinations thereof.

Water-soluble and/or hydrophilic polymers, which are cosmetically and pharmaceutically acceptable, include cellulose ether polymers, including those selected from the group consisting of hydroxyl alkyl cellulose, including hydroxypropyl methyl cellulose (HPMC), hydroxypropyl cellulose (HPC), hydroxyethyl cellulose (HEC), methyl cellulose (MC), carboxymethyl cellulose (CMC), and combinations thereof. Other polymers among those useful herein include polyvinylpyrrolidone, vinyl acetate, polyvinylpyrrolidone-vinyl acetate copolymers, polyvinyl alcohol (PVA), acrylates and polyacrylic acid (PAA), including polyacrylate polymer, vinylcaprolactam/sodium acrylate polymers, methacrylates, poly(acryl amide-co-acrylic acid) (PAAm-co-AA), vinyl acetate and crotonic acid copolymers, polyacrylamide, polyethylene phosphonate, polybutene phosphonate, polystyrene, polyvinylphosphonates, polyalkylenes, and carboxy vinyl polymers. The multiphasic compositions may comprise derivatives, copolymers, and further combinations of such polymers, as well.

Other polymers or water-soluble fillers among those useful herein include, without limitation, sodium alginate, carrageenan, xanthan gum, gum acacia, Arabic gum, guar gum, pullulan, agar, chitin, chitosan, pectin, karaya gum, locust bean gum, various polysaccharides; starches such as maltodextrin, amylose, corn starch, potato starch, rice starch, tapioca starch, pea starch, sweet potato starch, barley starch, wheat starch, modified starch (e.g., hydroxypropylated high amylose starch), dextrin, levan, elsinan and gluten; and proteins such as collagen, whey protein isolate, casein, milk protein, soy protein, keratin, and gelatin.

Further, non-limiting examples of water insoluble or hydrophobic polymers include cellulose, cellulose acetate, cellulose acetate phthalate, cellulose nitrate, ethylene-vinyl acetate copolymers, vinyl acetate homopolymer, ethyl cellulose, butyl cellulose, isopropyl cellulose, shellac, siloxanes, such as hydrophobic silicone polymer (e.g., poly(dimethylsiloxane) (PMDS)), poly(methyl methacrylate) (PMMA), natural or synthetic rubbers; polyethylene, polypropylene, polyesters, polyurethane, nylon, and copolymers, derivatives, and combinations thereof. The polymers may be crosslinked after formation by application of heat, actinic radiation or other methods of curing and treating polymers known to those of skill in the art. Other polymers include well known to those of skill in the art are suitable for use in pharmaceutical, oral care, and personal care compositions.

In various aspects of the present disclosure, the one or more polymers may be present in a liquid stream prior to electrified jetting or spraying at about 0.1 to about 100% by weight (on a wet basis). While the relative concentrations of polymers in a phase can vary greatly depending on the polymer, application, and process parameters used for forming the nano-component, in certain aspects, the additional polymer is optionally present at about 0.5% to about 50% by weight; optionally from about 1% to 15% by weight of the liquid stream on a wet basis.

Polymers within a selected phase can further be modified to interact and/or react with certain target moieties. For example, reactive groups on a polymer in a first phase may be cationic and the desired moiety for the surface is anionic and will be attracted to the surface of the first phase. In other embodiments, the functional groups on the polymer may participate in a reaction with a functional group present on the moiety, such that they react and are bonded to the surface of the phase. For example, if a first phase of the MPN has a polymer with a —CHO functional group at the surface and the moiety to be attached to the first phase has a —CH$_2$NH$_2$ functional group, such groups have an affinity to form a —C=N covalent bond, thus, the surface of the first phase has an affixed moiety presented at the surface.

Thus, after formation of the multiphasic nano-component, at least one phase can be designed to have one or more of the following properties based upon material selection: hydrophobic, positively-charged (cationic), negatively-charged (anionic), polyethylene glycol (PEG)-ylated, covered with a zwitterion, hydrophobic, superhydrophobic (for example having with water contact angles in excess of 150°), hydrophilic, superhydrophilic (for example, where the water contact angle is near or at 0°), olephobic/lipophobic, olephilic/lipophilic, and/or nanostructured, among others. In other aspects, one or more polymers or materials used within a phase may be functionalized to subsequently undergo reaction with various moieties or substances after formation of the multiphasic nano-component, to provide desired surface properties or to contain various moieties presented on the phase surface, as recognized by those of skill in the art.

Moreover, in certain embodiments, each phase can comprise a different moiety (e.g., each phase can be tagged with a different targeting moiety or active agent) or can optionally have different surface properties. Specifically, at least one phase can be selected to be hydrophilic, hydrophobic, positively charged (cationic), negatively charged (anionic), surface active agent modified (e.g., PEG-ylated or covered with a zwitterion), superhydrophobic, superhydrophilic, olephobic, olephilic, and/or nanostructured, as described above. A multiphasic nano-component phase can be designed to have such properties by providing such materials within the material forming the phase, or may be provided by subsequent treating, reacting, or coating of the exposed phase surface after formation of the MPN to achieve such properties.

In various aspects, one or more exposed phase surfaces comprise a moiety, such as those described in U.S. patent application Ser. No. 11/763,842. In certain aspects, the moiety may be provided to interact with the surrounding environment (for example, to avoid multiphasic nano-component detection by an immune system, provide optical properties to the multiphasic nano-component, provide binding to a biological or non-biological target, such as a medical device). In some aspects, the moiety is a binding moiety that provides the ability for the multiphasic nano-component to bind with a target. In certain aspects, the target may be an immune system cell, protein, enzyme, or other circulating agent associated with the animal).

The multiphasic nano-components can be used in accordance with the principles described in co-pending patent applications, U.S. patent application Ser. No. 11/763,842 entitled "Multiphasic Biofunctional Nano-components and Methods for Use Thereof" filed on Jun. 15, 2007, and in U.S. patent application Ser. No. 11/272,194 entitled "Multiphasic Nanoparticles" filed on Nov. 10, 2005, which are each incorporated herein by reference in their respective entireties. For example, as described in U.S. patent application Ser. No. 11/763,842, drug targeting can be more effective if the carrier and delivery systems for such active ingredients are improved by use of multiphasic nanoparticles by active drug targeting, which takes advantage of selective affinity of a drug construct to permit recognition of a target (e.g., a specific cell, tissue, or organ).

For example, a targeting moiety, such as an antibody, a peptide, a ligand, or an aptamer, is conjugated with an active ingredient itself or with a nanosystem (nanoparticles having at least one dimension less than about 1 μm or 1,000 nm, such as a nanoparticle, a liposome, a polysome, micelles, dendrimer-drug conjugates and the like) loaded with an active therapeutic agent. In some cases, direct coupling between a drug and targeting moiety limits the coupling capacity, thus, the use of alternate drug delivery vehicles would be advantageous. In contrast to targeting moieties, such as liposomes and polysomes, the multiphasic polymer-based nano-components have at least one therapeutic agent incorporated within the polymer matrix to provide new delivery or carrier systems.

In certain variations, the teachings of the present disclosure provide enhanced drug targeting or diagnostics, or enhanced efficacy of active ingredient delivery to a target site in an organism. Thus, in certain embodiments, the multiphasic nano-component may comprise one or more phases having an active ingredient. An active ingredient is a compound or composition that diagnoses, prevents, or treats a physiological or psychological disorder or condition, or can provide a cosmetic or aesthetic benefit. In certain aspects, an active ingredient agent is targeted to a particular target, such as organs, tissues, medical implants or devices, hair, skin, mouth, eyes, circulatory system, and the like. For example, in various aspects, the multiphasic nano-components having one or more active ingredients can be used in various pharmaceutical and/or cosmetic compositions.

As appreciated by one of skill in the art, the first phase and the second phase (or additional distinct phases) can optionally include active ingredients that are the same or different from one another. Thus, in certain aspects, the multiphasic component comprises a first phase having at least one active ingredient and a second distinct phase having at least one distinct active ingredient. For example, where a multiphasic composition comprises a first phase and a second distinct phase, the first phase comprises one or more first active ingredients and the second phase optionally likewise comprises one or more second active ingredients. When present, one or more of the first active ingredients of the first phase can be distinct from the one or more second active ingredients of the second phase. Thus, the first phase may comprise at least one distinct active ingredient from the second phase. Multiple phases of the composition may each respectively comprise at least one active ingredient and in some cases a plurality of distinct active ingredients.

In other aspects, one or more of the distinct phases of the multiphasic nano-component may have a common active ingredient. The first and second phases (or additional phases) may contain one or more of the same active ingredients or different active ingredient cocktails (i.e., plurality or mixture of active ingredients). In certain aspects, the inventive multiphasic nano-components comprise multiple pharmaceutically active ingredients, such as exclusive or generic drugs, or combinations thereof.

Where the multiphasic nano-components of the disclosure have one or more moieties that interact with a target associated with the animal, for example circulating cells or an organism's immune system cells, active ingredients can be delivered to a target site or target region within an organism by attachment to designated target region cells. In other aspects, the target may be associated with the target region itself, for example, infected or cancerous tissues or medical device surfaces. In this regard, the multiphasic nano-components can be delivered to the targeted tissue, for example, the site of infection, cancer, arteriosclerosis, and the like, for highly targeted and specific delivery.

In accordance with certain aspects of the present disclosure, the multiphasic nano-components can be suitable for use in a wide variety of biofunctional or bioactive applications. A "biofunctional" or "bioactive" substance refers to a chemical substance, such as a small molecule, macromolecule, metal ion, or the like, that causes an observable change in the structure, function, optical function, or composition of a cell when a cell is exposed to such a substance. Examples of observable changes include increased or decreased expression of one or more mRNAs, increased or decreased expression of one or more proteins, phosphorylation of a protein or other cell component, inhibition or activation of an enzyme, inhibition or activation of binding between members of a binding pair, an increased or decreased rate of synthesis of a metabolite, increased or decreased cell proliferation, changes in optical properties, and the like. In certain aspects, the multiphasic nano-components of the disclosure deliver active ingredients to a target, in some embodiments, to tissue or an organ of an organism. In other aspects, the multiphasic nano-components provide binding to certain target regions in an organism to modify optical or physical properties to improve diagnostic procedures.

Advanced design of multiphasic nano-components capable of promoting active ingredient delivery to a localized region are contemplated, such as cancer targeting. Such multiphasic nano-components are robust enough to function in a biological environment having proteins and cells. In certain aspects, the multiphasic nano-components, such as a biphasic nanoparticle, can serve as targeting elements for circulating blood cells carrying the active ingredient payload (e.g., chemotherapy drug) to the tumor. In accordance with the principles of the disclosure, the multiphasic nano-components enable the engineering of spatially separated surface interactions, as well as the establishment of independent release kinetics for respective phases of the multiphasic nano-components. These properties can improve active ingredient delivery.

Further, otherwise incompatible ingredients can be delivered simultaneously to a target region. One phase may contain a first active ingredient and a second phase may contain a second active ingredient that is otherwise incompatible with the first active ingredient. The first phase comprises materials compatible with the first component and the second phase similarly has materials compatible with the second component.

Thus, a lipophilic or hydrophobic active ingredient can be included in one phase of the multiphasic nano-component and a hydrophilic active ingredient can be included in a second phase, however both the first and second active ingredients are delivered and bioavailable to target tissues. Similarly, a cationic active ingredient can be contained in a first phase of the multiphasic nano-component and an anionic active ingredient contained in a second phase of the multiphasic nano-component to provide both cationic and anionic active ingredients concurrently to the target tissue.

Other conventional materials can be used to form the materials of respective liquid streams that form the nano-component phases, in addition to the solvents/carriers discussed above, such as plasticizers, cross-linking agents, surface active agents, fillers, bulking, or viscosity modifying agents, pH modifiers, pH buffers, antioxidants, impurities, UV stabilizers, and where appropriate, flavoring, or fragrance substances.

However, the present disclosure contemplates multiphasic nano-components comprising one or more active ingredients that provides a diagnostic, therapeutic, prophylactic, cosmetic, sensory, and/or aesthetic benefit to an organism, such as a mammal. In certain aspects, an active ingredient prevents or treats a disease, disorder, or condition of hard or soft tissue in an organism, such as a mammal.

Certain suitable active ingredients, or pharmaceutically active ingredients or drugs, are known to those of skill in the art and include, but are not limited to, low-molecular weight molecules, quantum dots, diagnostic imaging contrast agents, natural and artificial macromolecules, such as proteins, sugars, peptides, DNA, RNA, and the like, polymers, dyes and colorants, inorganic ingredients including nanoparticles, nanomaterials, and nanocrystals, fragrances, and combinations thereof. U.S. patent application Ser. No. 11/763,842 contains a listing of such suitable exemplary active ingredients, which can be introduced into the multiphasic nano-components, and all other suitable active ingredients known to those of skill in the art for these various types of compositions are contemplated.

In various aspects, a multiphasic nano-component delivers an effective amount of the active ingredient to a target region within an organism. An "effective" amount of an active ingredient is an amount that has a detectable effect for its intended purpose and/or benefit. Preferably, the effective amount is sufficient to have the desired therapeutic, nutritional, cleansing, aesthetic, diagnostic, and/or prophylactic effect on the target region of an organism (e.g., a mammal) to whom and/or to which the composition comprising the multiphasic nano-components is administered. The specific effective amount of the active ingredient, including appropriate dosages and concentrations, will vary with such factors as the composition in which the active ingredient is provided, the site of intended delivery, the route of administration, the particular condition or subject being treated, the nature of concurrent therapy (if any), the specific active used, the specific dosage form, and the carrier employed, all of which are well known to those of skill in the art.

In certain aspects, a safe and effective amount of an active ingredient in a phase of a multiphasic nano-component is about 0.0001 to about 95 weight % of the total weight of phase (on a dry basis); optionally about 0.01 to about 90 weight %. It should be noted that where the multiphasic nano-component is distributed in a carrier or composition, that the overall concentration will be significantly less than in the multiphasic nano-component particles. In certain aspects, the active ingredient is present in a phase on an multiphasic nano-component at a concentration of about 0.001 to about 75% of the total phase. In other aspects, the active ingredient is present at from about 0.01 to about 20%; optionally of about 1% to about 20%; and optionally 5% to about 20%. However, as discussed above, the concentration of active ingredient is highly dependent on various factors well known to those of skill in the art, including required dosage for the target region, bioavailability of the active ingredient and the release kinetics of the phase in which the active ingredient is located, among others.

The multiphasic nano-component has such an active ingredient dispersed within one or more phases. For example, such active ingredients can be suspended in a polymer solution or polymer melt. A first phase can be loaded with an active ingredient or multiple active ingredients. Likewise, a second phase can be loaded with an active ingredient or multiple active ingredients. In some embodiments, the plurality of phases may each contain one or more distinct active ingredients. The phases of the multi-phase composition can also include secondary release systems, such as nanoparticles with sizes equal or smaller than the phase, liposomes, polysomes, or dendrimers. Each of the secondary release systems can be include multiple types of active ingredients, as well, permitting a staging of release of a plurality of active ingredients. The secondary release systems can be formed with the same materials described above in the context of the multiphasic nano-components, however, can be distributed throughout a phase (for example as a continuous and discontinuous phase mixture). Thus, the secondary release system provides an additional amount of control over the release kinetics of active ingredients based and provides an even greater range of complex design and delivery options.

In certain aspects, the multiphasic nano-components are formed by electrified jetting of materials that comprise one or more polymers, such as that disclosed by Roh et al. in "Biphasic Janus Particles With Nanoscale Anisotropy", Nature Materials, Vol. 4, pp. 759-763 (October, 2005), as well as in above-referenced U.S. patent application Ser. No. 11/272,194.

In this regard, the multiphasic nano-components have a wide range of controlled release and/or optical properties. Such multiphasic nano-components can be designed to have pre-selected types and concentrations of active ingredients, such as cosmetic active ingredients, active ingredient drugs, fragrances and/or colorants. For example, such active ingredients can be used to dope the multiphasic nano-components with additives. Any number of suitable active ingredients can be used with the multiphasic nano-components. Moreover, the surface properties of each phase of the multiphasic nano-component can be tailored, as desired, to change the overall properties of the multiphasic nano-component.

EXAMPLE 1

Biphasic Jetting

The experimental setup for the present experiment conforms to that of FIG. 3. Two jetting liquids (Fluid A and Fluid B) are fed using a dual syringe applicator assembly (FIBRI-JET® SA-0100, Micromedics, Inc., Minn., USA). In this setup, two 1 mL syringes are controlled by one syringe pump. Each syringe is filled with separate jetting solutions. These two syringes are connected to a dual channel tip (FIBRIKF™ SA-0105, Micromedics, Inc., Minn., USA) which has a dual cannula with a dimension of 26 gauge and 3 inch length. These dual cannula or capillaries are covered with a transparent plastic tube that ties these two capillaries in side-by-side fashion. In order to avoid the capillary pressure caused by the groove between the two round shape cannula and create a stable biphasic pendent droplet from the side-by-side capillary setup, the tip end level is made even by the sharp cutting of the two capillaries and the plastic tube.

In this example, the material properties of Fluid A and Fluid B (both liquids) are similar. In this example, compatibility between the two jetting solutions is used to achieve a stable interface between the two phases, and basic components (i.e., polymer and solvent) can be the same to achieve similar viscosity, surface tension, and the like. However, each side includes a different active ingredient that is maintained in each phase throughout the process. Preventing diffusion of these different active ingredients between phases (from one phase to the other) is usually avoided until the point of solidification. In line with the above mentioned objectives, mixtures of PEO as a polymer and an active ingredient comprising Cyclosporin, suspended in water, is selected as active ingredient for each side of the jetting solution. PEO (average molecular weight 600,000) is purchased from Aldrich Co. (USA). Jetting is performed with solutions which are composed of 8% of polyacrylic acid and 1% of Cyclosporin by weight in Fluid A and 10% of poly(acrylic acid-co-polyacrylamide) and 1% of Cyclosporin by weight in Fluid B for the second organic jetting solution.

8 kV of electric potential is applied between 25 cm separation of the electrodes. A glass slide is covered with aluminum foil except about 80% of the surface of one face, and the jetting is performed on the open face of the glass slide. Electrodes are connected directly to the side-by-side capillaries and the aluminum foil covering the glass slide substrate. A flow rate of 0.1 mL/hour is set for each side. A beads-on-string morphology is generated, for example, as shown in FIG. 10.

EXAMPLE 2

Multiphasic Jetting

Poly(DL lactide-co-glycolide) (PLGA) polymers with a lactide: glycolide monomer ratio of 85:15 and 50:50 ($M_w$=50-75,000 g/mol, 45-75,000 g/mol), chloroform, n,n-dimethylformamide (DMF), and triethylamine (TEA) commercially available from Aldrich, USA are used in electrified jetting methods described herein. Polythiophene dyes ADS 306 PT ($M_w$=20-70,000 g/mol) and ADS 406PT ($M_w$=30-80,000 g/mol) are commercially from American Dye Source, Canada. The experimental setup for the present experiment conforms to that of Example 1 above; however, the setup is modified to be closed on all four sides with PLEXIGLAS™ doors, and placed inside a fume hood. Trace amounts of the macromolecular dyes are used. Confocal laser scanning microscopy (CLSM) images are obtained with an OLYMPUS™ FV-500 confocal laser scanning microscope. Argon laser (488 nm) and UV laser (405 nm) are used to excite ADS306PT (detection wavelength range: 560-600 nm) and ADS 406 PT (detection wavelength range: 405-435 nm) respectively. Scanning electron microscope (SEM) images are obtained using a PHILIPS™ XL30 FEG environmental scanning electron microscope (ESEM). SEM samples are coated with a layer of gold (at a thickness of about 35 nm) using a sputter coating device sold by Hummer, USA.

Table 1 summarizes the parameters that are varied to produce three different shapes and the characteristics of each shape. The concentrations are the same for each phase. Phase 1 is PLGA 8515 with ADS 306PT dye. Phase 2 is a PLGA 5050 with ADS 406PT dye. Concentrations are w/w, solvent ratios are by volume, amount of TEA is percentage by volume of the solvent, and flow rate is in mL/h. Particles are made in cone jet mode, at 23° C. inside a fume hood of face velocity of about 95-102 ft/s. The distance between the needle tip and counter electrode (piece of Aluminum foil) is 13 inches.

TABLE 1

| | Concentration (w/w) | Solvent ratio ($HCL_3$:DMF) | TEA | Flow rate (ml/h) |
|---|---|---|---|---|
| Fibers | 18 | 95:5 | — | 0.02 |
| Rods | 3.6 | 95:5 | 3.6 | 0.4 |
| Spheres | 4.5 | 97:3 | — | 0.2 |
| Discs | 1.3 | 95:5 | — | 0.15 |

FIGS. 1A-1D, 2A-2D, 7A-7B, 8A-8M, and 9A-9B show the CLSM images and scanning electron micrographs of the nano-components formed as particles (spheres, rods, and discs) and fibers. While not limiting the present teachings to any particular theory, it is believed that a low concentration of polymer in the mixed liquid stream combined with a liquid high flow rate during electrified jetting causes rapid solvent evaporation from the surface of the droplet. In this regard, an "outer skin" of the polymer is formed, which is believed to cause the spherical droplet to collapse and form a disc. The microspheres are a mixture of biphasic and "sandwich-like" phase distribution, with one phase enveloping the other. This phenomenon is seen in rods, as well, and might be due to a combination of conductivity effects and "swirling" action of the cone. The rod formation is thought to be due to a combination of high solvent evaporation rates from the mixed stream and high polymer concentrations, where a majority of the droplets are "frozen" into rod-like shapes. At least about 72% of the total particles analyzed are from Experiment 2 are rods. Furthermore, each of the fibers has a major axis substantially aligned along a single orientation, which is believed to be due to a combination of the stabilizing viscoelastic force, voltage and inertial forces during electrojetting.

EXAMPLE 3

Multiphasic Disc-Shaped Nano-Components

Solutions of poly(lactide-co-glycolide polymer (PLGA) in a mixture of 95:5 chloroform:dimethylformamide (DMF) by volume are prepared at concentrations ranging from about 1 to about 3.5% w/w (e.g., 1.3 wt. % PLGA 85:15 first phase and 50:50 second phase). Two streams containing PLGA in the solvent mixture of chloroform and DMF are co-jetted together. Two parallel polymer flows are introduced in a nozzle with the configuration described above for Example 1 (side-by-side geometry). External conditions are ambient, including temperature, pressure, and humidity. Under these conditions, a droplet forms at the tip of the nozzle. Upon application of a sufficiently strong electrical field (applied voltage of 6 kV) between the nozzle and a counterelectrode, which serves as the collector (distance therebetween of about 13 inches), a polymer thread is ejected from the droplet resulting in biphasic disks with one phase predominately comprising PLGA (50:50) and the other phase predominately comprising PLGA (85:15).

EXAMPLE 4

Multiphasic Rod Nano-Components

Solutions of 3.6% w/w/poly(lactide-co-glycolide polymer (PLGA) (50:50 in a first phase and 85:15 in a second phase) are created with a mixture of 95:5 chloroform:DMF and trimethylamine (TEA) at about 3.6% w/w of solvent. Two streams containing PLGA (50:50 and 85:15) in the solvent mixture of chloroform, DMF, and TEA are co-jetted together. Two parallel polymer flows are introduced in a nozzle with the configuration described above for Example 1 (side-by-side geometry). The applied voltage is 7.14 kV, the distance between needle tip and counterelectrode/collector is about 13 inches, temperature is ambient (about 23.5° C.), and the flow rate is set to 0.45 mL/h. A plurality of rod shapes having a length of less than about 20 µm is produced.

EXAMPLE 5

Multiphasic Sphere Nano-Components

Solutions of 3.8% w/w/poly(lactide-co-glycolide polymer (PLGA) (50:50 in a first phase and 85:15 in a second phase) are created with a mixture of 95:5 chloroform:DMF and trimethylamine (TEA) at about 3.6% w/w of solvent. Two streams containing PLGA (85:15 and 50:50) in the solvent mixture of chloroform, DMF, and TEA are co-jetted together. Two parallel polymer flows are introduced in a nozzle with the configuration described above for Example 1 (side-by-side geometry). The applied voltage is 6.6 kV, the distance between needle tip and counter-electrode/collector is about 13 inches, temperature is ambient (about 23.5° C.), and the flow rate is 0.3 mL/h. A plurality of rod shapes having a length of less than about 20 µm is produced.

EXAMPLE 6

Multiphasic Nano-Components

Using the side-by-side configuration described in FIGS. 3 and 4, electrohydrodynamic co-jetting of organic solutions of mixtures of different PLGA polymers including PLGA 85:15, PLGA 50:50 is conducted under ambient conditions to form multiphasic discs, spheres, and rods.

The poly(lactide-co-glycolide) copolymers have lactide: glycolide ratios of 85:15 ($M_W$=40-75 kg/mol) and 50:50 ($M_W$=50-75 kg/mol), chloroform, N,N-dimethylformamide (DMF), ethanol, and fluorescein isothiocyanate (FITC) are all commercially available from Sigma-Aldrich, USA. Polythiophene polymers are sold under commercial names ADS 306PT (MW=20-70 kg/mol) and ADS 406PT ($M_W$=30-80 kg/mol).

Electrohydrodynamic co-jetting, parallel extrusion of two miscible jetting solutions through a macroscopic nozzle is conducted. High jetting velocities are obtained by application of electrical potential in the range of 4-6 kV between the nozzle and a counter-electrode, which acts as collection reservoir. Under these conditions, the polymer solutions are rapidly elongated resulting in a reduction in jet diameter by several orders of magnitude. Reduction in jet diameter results in rapid evaporation of the solvent and solidification of polymers and other additives to form particles or fibers with multiple compartments.

Samples for confocal microscopy are prepared by jetting on top of glass cover slips (24-50 mm, Fisher Scientific, USA), which, in turn, are placed on top of the aluminum substrate. The cover slips are mounted on glass slides using DI water and examined with a confocal laser scanning microscope (CLSM) (Olympus FluoView 500, USA). For the selectively modified particles, about 20 mL of an aqueous particle suspension is placed onto a glass coverslip and imaged. The selectively modified fibers are detached from the foil and mounted onto glass coverslip with DI water. ADS406PT is excited by a 405 nm UV laser. A 488 nm Ar argon laser is used to excite ADS306PT and FITC. Optical filters for 430-460 nm, 505-525 nm and 560-600 nm emission wavelength are used to visualize the fluorescence of ADS 406PT, FITC and ADS306PT respectively) are sold by American Dye Source, Canada.

Figure 7:
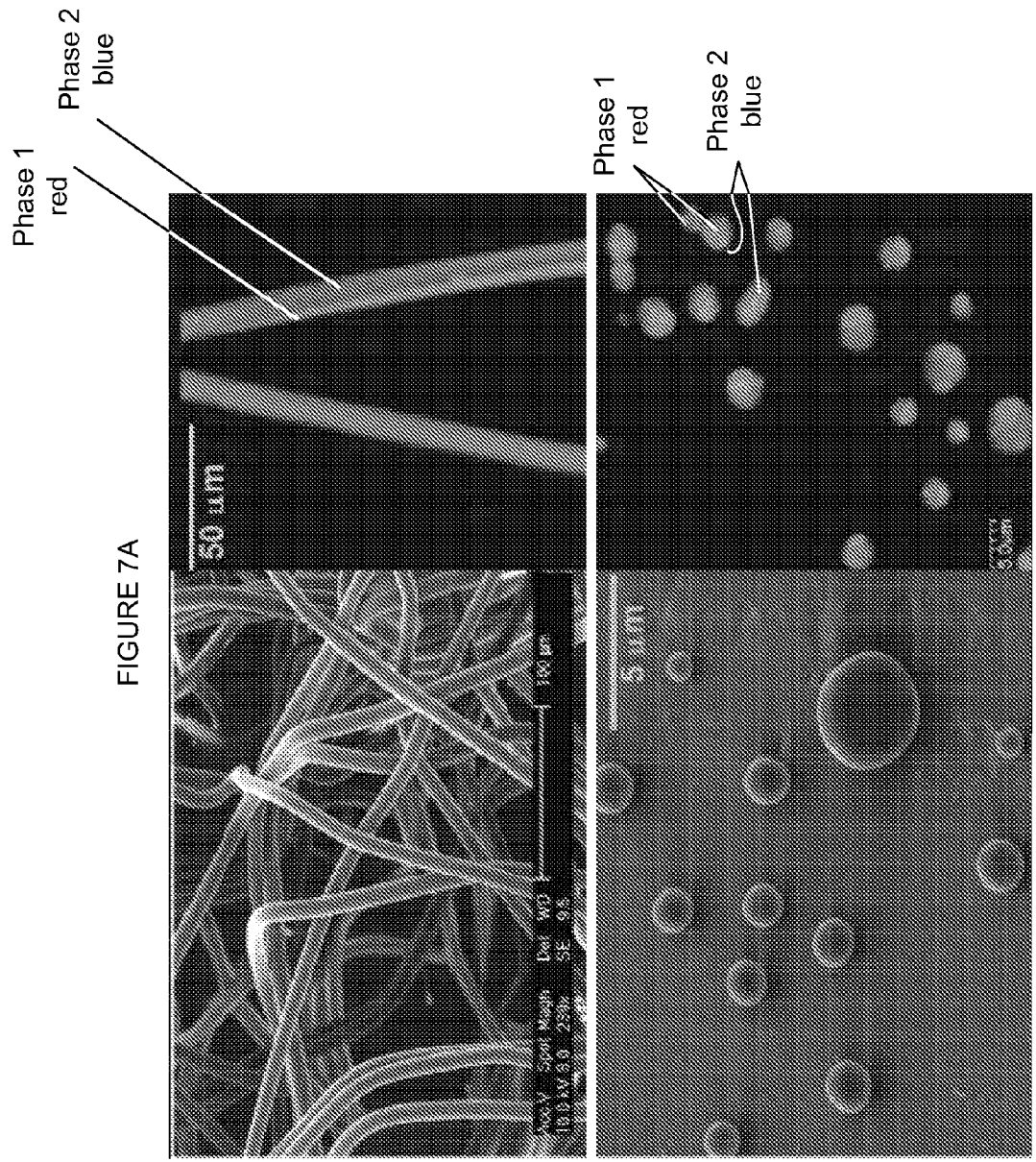
FIGS. 7A and 7B show SEM and CLSM images of biphasic microfibers nano-components prepared with PLGA 85:15 (first phase red) and PLGA 50:50 (second phase blue) (FIG. 7A) and biphasic microparticle nano-components prepared with PLGA 85:15 (first phase red) and PLGA 50:50 (second phase blue) in accordance with the present disclosure.

FIGS. 7A and 7B show representative SEM and CLSM micrographs of biphasic nano-components (e.g., microfibers and microparticles), with red and blue depicting PLGA 85:15 (labeled with ADS306PT) and PLGA 50:50 (labeled with ADS406PT) phases, respectively. As discussed above, diameter and stability of the jet have a complex dependence on several solution and process parameters. The dominating solution parameters in these experiments are surface tension and conductivity, both of which depend on the solvent, which constitutes the majority of the jetting solution. A solvent mixture of 97:3 (v/v) chloroform:DMF is selected, because the use of two different solvents combines the advantages offered by a highly volatile solvent with some performance features of a less volatile solvent. Rapid evaporation of the more volatile chloroform, which constitutes the majority of the solution, increases the charge to volume ratio of the droplet, which facilitates rapid jet formation (and breakup). In certain aspects, instant solvent evaporation is highly desirable; in fact, this is the main factor driving the jet formation because the low conductivity (about 0.01-0.05 μS/cm) of the organic jetting solutions limits their ability to induce charge and undergo jet formation. Addition of a small portion of the co-solvent, DMF increases the dielectric constant of the solution, thereby reducing jet (and particle) diameter. Being relatively non-volatile, it also enhances the long-term stability of the droplet (and hence, the Taylor cone).

A 4.5% (w/w) solution of PLGA 85:15 is jetted to form one phase and PLGA 50:50 in the other, with trace amounts (about 0.01 wt. % of PLGA) of the polythiophene polymers for imaging purposes, produced biphasic particles at a flow rate of 0.2 mL/h (FIG. 7B). A gradual increase in the applied voltage leads to a dripping mode, followed by the desired "cone jet mode." Due to the lower conductivity of the jetted streams, the base of the Taylor cone is observed to extend well into the droplet, and is not confined to the droplet tip, as tends to be observed for solutions with higher conductivity, such as aqueous solutions. An increase in the voltage causes a lateral shift in the droplet jet, but the interface of the two solutions still remains stable and biphasic particles are produced. However, in this system, a further increase in voltage disrupts the interface by formation of twin cones (greater than about 6 kV), followed by a multi-jet spray at even higher voltages (greater than about 6.5 kV). Cone stability is enhanced by increasing the flow rates, which ensures a more sustained supply of jetting solutions. On the other hand, increasing the flow rate also results in an increase in jet diameters and larger average particle sizes.

SEM micrographs of biphasic particles reveal spherical particles ranging from 2-5 mm in diameter, with a small percentage (less than about 8%) of the population being comprised of flattened, donut-shaped biphasic particles of about 8 mm. Larger particles are formed from an intermittent Taylor cone of partly "solidified" jetting solutions with higher apparent viscosities. In contrast, higher polymer concentrations (18% w/w PLGA in 95:5 v/v chloroform:DMF in each phase) in conjunction with lower flow rates (0.02 mL/h) results in fabrication of well-defined biphasic fibers with diameters of the order of 10-20 mm (FIG. 7A).

Higher polymer concentrations (13 to 23% w/w of polylactide copolymer in Chloroform containing 5-10% by vol. dimethyl formamide in each phase) in conjunction with lower flow rates (0.01-0.1 mL/h) result in fabrication of well-defined biphasic fibers. During the cojetting, a single polymer jet is ejected from the cone tip. Higher polymer concentrations result in greater cone stability, as compared to co-jetting of particles, and the Taylor cone can be uninterruptedly maintained for several hours. In fact, bending and whipping instabilities typically associated with electrospinning are widely suppressed under these conditions. However, the lower flow rates as well as the relatively short collecting distance (5-25 cm) can contribute to the reduction of jetting instabilities.

Co-electrospinning from multiple nozzles adjacent to one another results in a facile transition to three and four compartmental fibers with the interface between different solutions being maintained in a superior fashion. The orientation of individual compartments can be manipulated through relative macroscopic configuration of needles during co-electrospinning. A linear arrangement of three needles results in a microfiber with elongated compartments positioned side-by-side, whereas a triangular needle configuration gives rise to "pie" shaped anisotropy. In the side by side triphasic fibers, switching the arrangement of capillaries containing the red, blue and green dye loaded solutions leads to corresponding changes in the fibers. This process can be conveniently extended up to a plurality of phases, including 4, 5, 10 and the like.

FIGS. 8A through 8M show various multiphasic nano-components formed in accordance with the methods of the present disclosure with biodegradable PLGA polymers, including aligned multiphasic microfibers, where respective phases contain blue fluorescence (B) (poly[(m-phenylenevinylene)-alt-(2,5-dibutoxy-p-phenylenevinylene)](MEH-PPV) colorant), green fluorescence (G) (poly[tris(2,5-bis(hexyloxy)-1,4-phenylenevinylene)-alt-(1,3-phenylenevinylene)] (DPV) colorant), and red (R) fluorescence (substituted polythiophene (ADS306PT) colorant). Each of these colorants is commercially available from Sigma-Aldrich.

Three liquid streams are co-jetted, where each liquid stream has 18 w/w % of 85:15 PLGA in 95:5 chloroform:DMF solvent. The three streams are co-jetted at 0.03 mL/h in an electric field with an applied voltage of 9 kV. FIGS. 8A and 8C-8D show SEM and CLSM, respectively, aligned biphasic fibers (where 8D is the cross-sectional view). FIGS. 8E through 8K show aligned triphasic microfibers and their respective cross-sections, as described above, where three side-by-side capillaries are used to electro-hydrodynamically co-jet three phases respectively containing red, green, and blue in left, central and right orientation of syringes (FIG. 8D is RBG orientation; FIG. 8E is RGB orientation; and FIG. 8F is BRG orientation) to provide different triphasic repeating patterns of aligned fibers. FIG. 8B is an SEM of a microscopic ordered bundle of fibers prepared in accordance with the present. Further, CLSM of tetraphasic fibers having different phase orientation are shown in FIGS. 8L-8M, formed by jetting four distinct phases. FIG. 8L shows an alternating phases 1-4 (ABCD pattern), as where FIG. 8M is formed via a diamond pattern of jetting the respective four phases, namely a diamond pattern is formed by phases 2 and 3 adjacent phases 1 and 4.

Figure 9A:
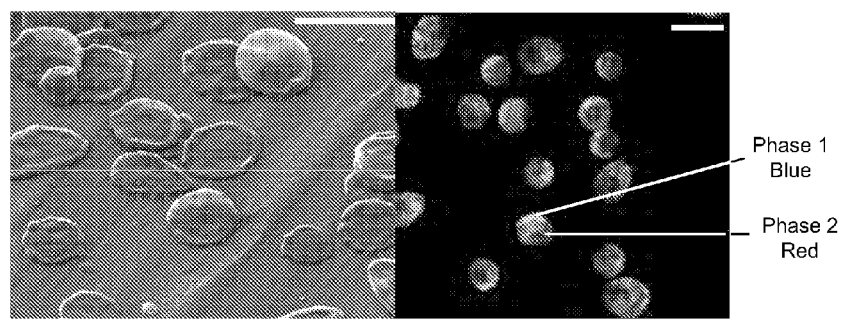
FIGS. 9A through 9C show SEM and CLSM of disc shaped nano-components (FIG. 9A), spherical shaped nano-components (FIG. 9B), and rod shaped nano-components (FIG. 9C) formed in accordance with the present disclosure.
Figure 9B:
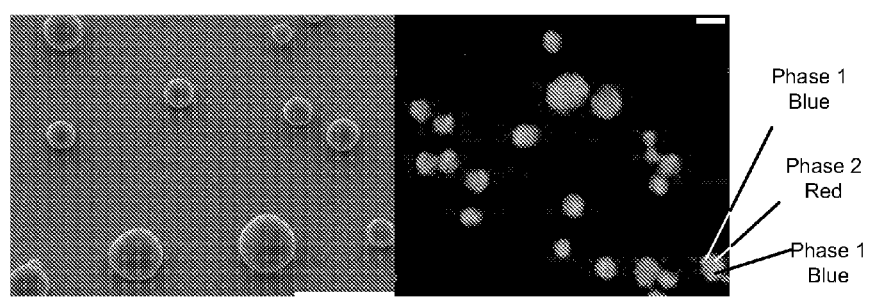

FIGS. 9A-9C show respectively, disc shaped nano-components, sphere shaped nano-components, and rod shaped nano-components. FIG. 6A shows the particle size distribution for discs from FIG. 9A (particle size versus number fraction of total particle population), FIG. 6B shows particle size distribution for spheres from 9B (particle size versus number fraction of total particle population), FIG. 6C shows particle size distribution for rods from 9C (particle size versus number fraction of total particle population), and FIG. 6D shows a particle size distribution for filtered biphasic spheres from FIG. 9B.

During the cojetting, a single polymer jet is ejected from the cone tip. Higher polymer concentrations resulted in greater cone stability, as compared to co-jetting of particles, and the Taylor cone can be uninterruptedly maintained for several hours. Lower flow rates and relatively short collecting distance can contribute to the reduction of jetting instabilities, as well. Confocal micrographs reveal a near to perfect "half-to-half" phase distribution, which again, strongly supports the assumption that the interface between the two solutions in the droplet is maintained in a stable manner for long periods of time.

Electrohydrodynamic jetting processes of the present disclosure can be used with a wide range of specialty and non-specialty materials including many currently Federal Drug Administration (FDA) approved polymers. Each respective phase can be designed independently from the other phase(s) enables the combination of multiple material functions during design. The present disclosure provides for a high degree of control over shape, size, and/or orientation of phases during the formation of biodegradable multiphasic nano-components and micro-components. In certain aspects, biphasic electrified jetting process provides fabrication of multiphasic micro-particles of different shapes or sizes. Selective modification of each phase with ligands, combined with their shape can potentially be used to understand the fundamentals behind cell response to different foreign objects. Other contemplated applications include light displays and biosensors.

The description provided in the present disclosure is merely exemplary of the inventive concepts in nature and, thus, variations that do not depart from the gist of the invention are intended to be within the scope of the invention. Such variations are not to be regarded as a departure from the spirit and scope of the invention.

What is claimed is:

1. A method of making a multiphasic nano-component comprising:
   forming a plurality of nano-components having a high shape selectivity for a shape selected from the group consisting of: discs, rods, spheres, toroids, and combinations thereof, by jetting two or more liquid streams together and passing them through an electric field generated by electrodes sufficient to form a cone jet that is fragmented to form said plurality of nano-components, each respectively having a first phase and at least one additional phase distinct from said first phase, wherein each of said first phase and said at least one additional phase respectively defines an exposed surface and wherein at least one of said phases comprises a polyester polymer, wherein said forming includes controlling one or more of: concentration of said polymer in said liquid streams, flow rate of liquid streams, humidity, temperature, design of said electrodes, and configuration of said electrodes during said jetting.

2. The method of claim 1, wherein said polyester polymer is selected from the group consisting of polylactides, polyglycolides, co-polymers, derivatives, and combinations thereof.

3. The method of claim 1, wherein said polymer comprises a poly(lactic co-glycolide) polymer.

4. The method of claim 3, wherein said shape is a rod and a flow rate of the liquid stream is controlled to be greater than or equal to about 0.4 milliliters per hour and less than or equal to about 0.7 milliliters per hour and a concentration of said poly(lactic co-glycolide) polymer in said jetting liquid is about 3 to about 4 weight % of the total jetting liquid.

5. The method of claim 3, wherein said shape is a sphere and a flow rate of the liquid stream is controlled to be less than or equal to about 0.2 milliliters per hour and a concentration of said poly(lactic co-glycolide) polymer in said jetting liquid is greater than about 4 weight % of the total jetting liquid.

6. The method of claim 3, wherein said shape is a disc and a flow rate of the liquid stream is controlled to be less than or equal to about 0.2 milliliters per hour and a concentration of said poly(lactic co-glycolide) polymer in said jetting liquid is about 0.5 to about 2 weight % of the total jetting liquid.

7. The method of claim 3, wherein said poly(lactic co-glycolide) polymer has a ratio of lactic acid monomer to glycolic acid monomer ranging from about 15:85 to about 85:15.

8. The method of claim 1, wherein said polymer is present in each said liquid stream at about 0.5 weight % to about 20 weight % of the total liquid stream.

9. The method of claim 1, wherein said high shape selectivity corresponds to forming at least about 50% of said plurality of nano-components having substantially the same shape.

10. The method of claim 1, wherein said high shape selectivity corresponds to forming at least about 70% of said plurality of nano-components having substantially the same shape.

11. The method of claim 1, wherein said first phase comprises a first active ingredient and said at least one additional phase comprises a second active ingredient.

12. The method of claim 1, wherein said first phase and/or said at least one additional phase comprises a pharmaceutically and/or cosmetically active ingredient.

13. A method of making a multiphasic nano-component comprising:
    forming a plurality of nano-components by jetting two or more liquid streams together and passing them through an electric field generated by electrodes sufficient to form a cone jet that is fragmented to form said plurality of nano-components, each respective nano-component having a first phase and at least one additional phase distinct from said first phase, wherein each of said first phase and said at least one additional phase respectively defines an exposed surface and wherein at least one of said phases comprises a polymer and said forming of said plurality of nano-components includes controlling one or more of: concentration of said polymer in said liquid streams, flow rate of said liquid streams, humidity, temperature, design of said electrodes, and configuration of said electrodes during said jetting to form at least about 50% of the plurality of nano-components having substantially the same shape, size, and/or orientation of said first phase or said at least one additional phase.

14. The method of claim 13, wherein said polymer is a polyester polymer selected from the group consisting of polylactides, polyglycolides, co-polymers, derivatives, and combinations thereof.

15. The method of claim 13, wherein said polymer is selected from the group consisting of polylactic acid, polycaprolactone, polyglycolic acid, poly(lactide-co-glycolide polymer (PLGA), and copolymers, derivatives, and combinations thereof.

16. The method of claim 13, wherein said high selectivity corresponds to forming at least about 70% of said plurality of nano-components having substantially the same shape, size, and/or orientation of said first phase or said at least one additional phase.

17. The method of claim 13, wherein said high selectivity corresponds to forming at least about 80% of said plurality of nano-components having substantially the same shape, size, and/or orientation of said first phase or said at least one additional phase.

18. A method of making a multiphasic nano-component comprising:
    forming a plurality of nano-components by jetting two or more liquid streams together and passing them through an electric field generated by electrodes sufficient to form a cone jet that is fragmented to form said plurality of nano-components, each respective nano-component having a first phase and at least one additional phase distinct from said first phase, wherein each of said first phase and said at least one additional phase respectively defines an exposed surface and wherein at least one of said phases comprises a polymer selected from the group consisting of polylactides, polyglycolides, co-polymers, derivatives, and combinations thereof;

wherein said forming of said plurality of nano-components includes controlling one or more of: concentration of said polymer in said liquid streams, flow rate of said liquid streams, humidity, temperature, design of said electrodes, and configuration of said electrodes during said jetting to form at least about 70% of the plurality of nano-components having substantially the same shape.

* * * * *

UNITED STATES PATENT AND TRADEMARK OFFICE
CERTIFICATE OF CORRECTION

PATENT NO. : 8,043,480 B2  
APPLICATION NO. : 12/257945  
DATED : October 25, 2011  
INVENTOR(S) : Joerg Lahann et al.

Page 1 of 2

It is certified that error appears in the above-identified patent and that said Letters Patent is hereby corrected as shown below:

Title Page, No. (63), Related U.S. Application Data, lines 2-3, "Pat. No. 7,767,017, application No. 12/257,945." should be --Pat. No. 7,767,017.--.

Figure 8:
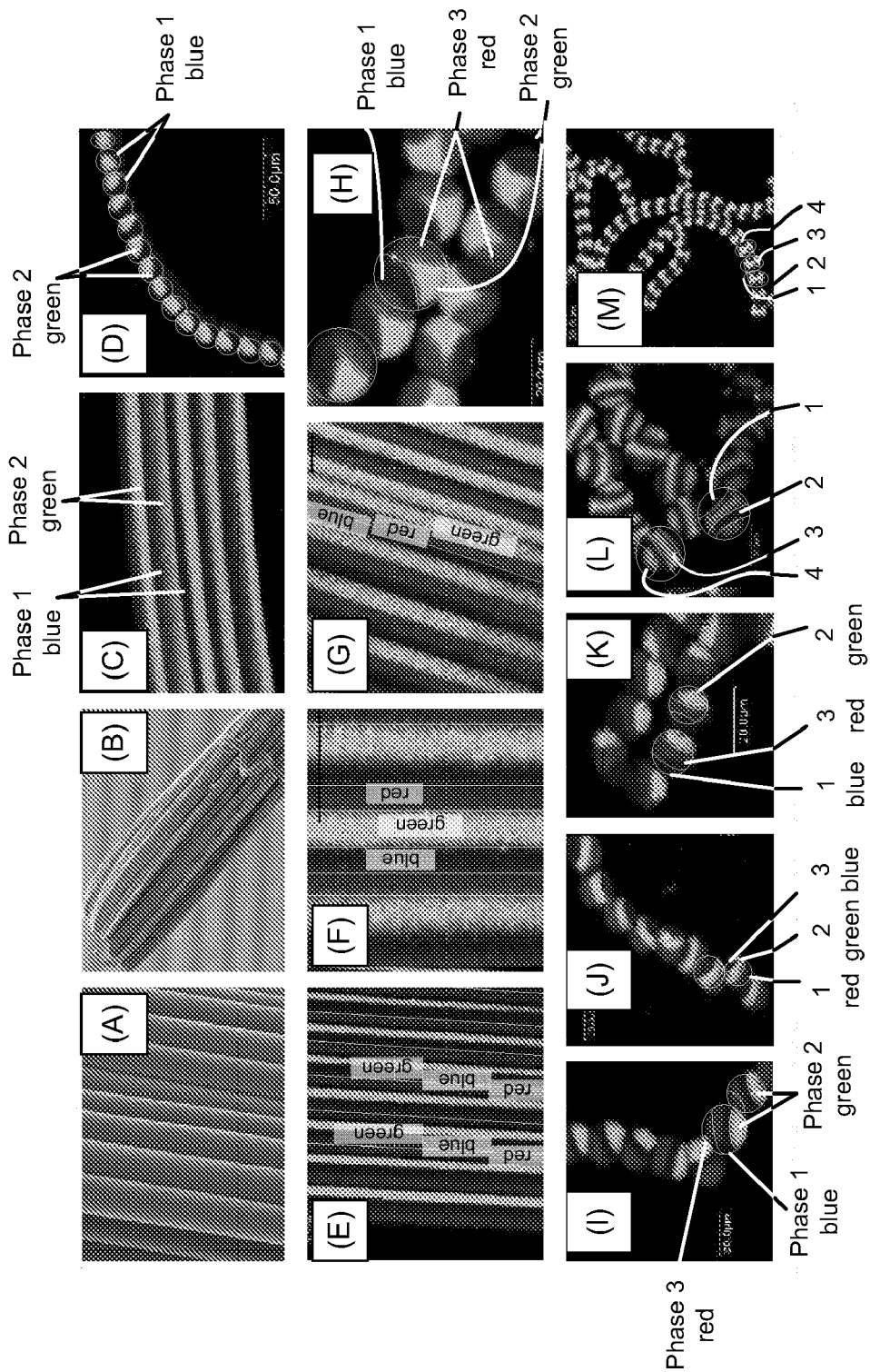
FIGS. 8 shows various multiphasic nano-components formed in accordance with the methods of the present disclosure with biodegradable PLGA polymers, including SEM and CLSM images of various aligned multiphasic microfibers.
Figure 9C:
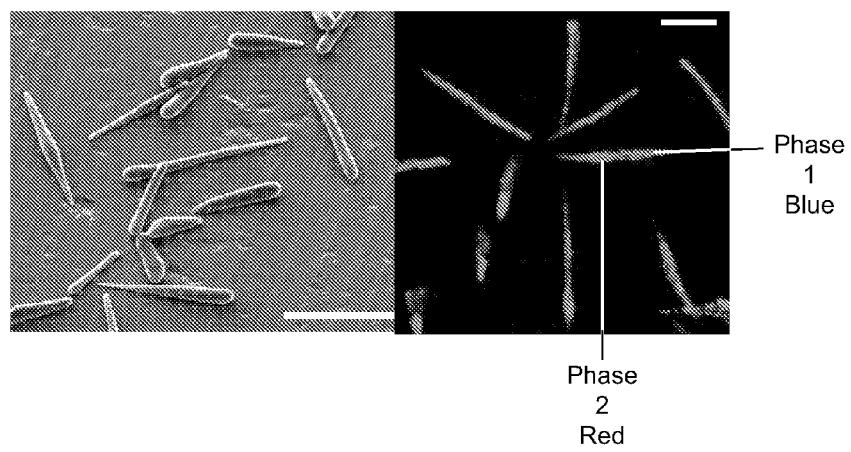

Column 3, line 10, "FIGS. 8" should be --FIG. 8--.

Column 6, line 17, "drop" should be --droplet--.

Column 6, line 35, "liquids" should be --liquid--.

Column 6, line 51, after "compatible" insert --with--.

Column 9, line 5, after "nanoparticles" delete "can".

Column 9, lines 65-66, after "jetting" insert --)--.

Column 11, line 26, "an multi-electrode" should be --a multi-electrode--.

Column 12, line 5, after "(lactide-co-glycolide" insert --)--.

Column 18, line 43, "an multiphasic" should be --a multiphasic--.

Column 18, line 66, after "can" delete "be".

Column 21, line 11, after "analyzed" delete "are".

Column 21, line 21, after "(lactide-co-glycolide" insert --)--.

Column 21, line 44, after "(lactide-co-glycolide" insert --)--.

Signed and Sealed this  
Sixth Day of March, 2012

David J. Kappos  
*Director of the United States Patent and Trademark Office*

CERTIFICATE OF CORRECTION (continued)
U.S. Pat. No. 8,043,480 B2

Column 21, line 62, after "(lactide-co-glycolide" insert --)--.

Column 22, line 24, "MW" should be --$M_W$--.

Column 24, line 34, after "shows" delete "an".

Column 26, line 20, Claim 13, "fregmented" should be --fragmented--.

Column 26, line 41, Claim 15, after "lactide-co-glycolide" insert --)--.